(12) United States Patent
Ono et al.

(10) Patent No.: US 11,621,733 B2
(45) Date of Patent: *Apr. 4, 2023

(54) RADIO-FREQUENCY CIRCUIT AND COMMUNICATION DEVICE

(71) Applicant: Murata Manufacturing Co., Ltd., Kyoto (JP)

(72) Inventors: Atsushi Ono, Nagaokakyo (JP); Satoshi Tanaka, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,550

(22) Filed: Oct. 14, 2021

(65) Prior Publication Data

US 2022/0069847 A1 Mar. 3, 2022

Related U.S. Application Data

(63) Continuation of application No. 16/926,338, filed on Jul. 10, 2020, now Pat. No. 11,177,841.

(30) Foreign Application Priority Data

Jul. 11, 2019 (JP) .............................. JP2019-128931

(51) Int. Cl.
*H04B 1/00* (2006.01)
*H04W 76/16* (2018.01)
*H04B 1/04* (2006.01)

(52) U.S. Cl.
CPC .......... *H04B 1/0067* (2013.01); *H04B 1/006* (2013.01); *H04B 1/04* (2013.01); *H04W 76/16* (2018.02); *H04B 2001/0408* (2013.01)

(58) Field of Classification Search
CPC .... H04B 1/006; H04B 1/0064; H04B 1/0067; H04B 1/04; H04B 1/40; H04B 1/401;

(Continued)

(56) References Cited

U.S. PATENT DOCUMENTS 7,885,613 B2 2/2011 Kemmochi et al.
8,768,410 B2 7/2014 Oka et al.
(Continued)

FOREIGN PATENT DOCUMENTS

CN 108768434 A 11/2018
CN 109155639 A 1/2019
(Continued)

OTHER PUBLICATIONS

Huawei, Hisilicon, ON dual PA UE capability, 3GPP TSG-RAN WG4 Meeting #90, R4-1901608, Feb. 25-Mar. 1, 2019, pp. 1-3, 3GPP, Athens, Greece.

(Continued)

*Primary Examiner* — Quochien B Vuong
(74) *Attorney, Agent, or Firm* — Pearne & Gordon LLP

(57) ABSTRACT

A radio-frequency circuit is used in simultaneous transfer of a radio-frequency signal of 4G and a radio-frequency signal of 5G, and includes a first transfer circuit that selectively receives the 4G radio-frequency signal or the 5G radio-frequency signal, and transfers a radio-frequency signal of a first communication band including a first transmission band and a first reception band and a radio-frequency signal of a second communication band including a second transmission band and a second reception band. The first and second transmission bands at least partially overlap. The first transfer circuit includes a first power amplifier that amplifies transmission signals of the first and second communication bands, and a first transmission filter that has a first passband including the first and second transmission bands, and passes the transmission signals of the first and second communication bands output from the first power amplifier.

13 Claims, 7 Drawing Sheets

(58) Field of Classification Search
CPC .................. H04B 1/406; H04B 17/13; H04B 2001/0408; H04W 76/16; H04W 88/02; H04W 88/06; H03F 2200/111; H03F 2200/451

See application file for complete search history.

(56) References Cited

U.S. PATENT DOCUMENTS

| | | |
|---|---|---|
| 9,819,310 B2 | 11/2017 | Wu et al. |
| 9,837,972 B2 | 12/2017 | Arkiszewski et al. |
| 10,439,670 B2 | 10/2019 | Kang et al. |
| 10,506,666 B2 | 12/2019 | Rice et al. |
| 10,560,139 B2 * | 2/2020 | Brunel .................. H04B 1/04 |
| 10,673,470 B2 * | 6/2020 | Lee ........................ H04B 1/40 |
| 2016/0380652 A1 | 12/2016 | Anthony et al. |
| 2019/0115947 A1 | 4/2019 | Nosaka |

FOREIGN PATENT DOCUMENTS

| | | |
|---|---|---|
| JP | 2014-090222 A | 5/2014 |
| JP | 2017-17691 A | 1/2017 |
| WO | 2020/003996 A1 | 1/2020 |

OTHER PUBLICATIONS

Office Action for Chinese Patent Application No. 202010650820.0 dated Sep. 7, 2021.

\* cited by examiner

RADIO-FREQUENCY CIRCUIT AND COMMUNICATION DEVICE

CROSS REFERENCE TO RELATED APPLICATIONS

The present application is a continuation of U.S. patent application Ser. No. 16/926,338 filed on Jul. 10, 2020, which is based on and claims priority to Japanese Patent Application No. 2019-128931 filed on Jul. 11, 2019. The entire disclosures of the above-identified applications, including the specification, drawings and claims, are incorporated herein by reference in their entireties.

BACKGROUND

The present disclosure relates to a radio-frequency circuit and a communication device including the radio-frequency circuit.

Radio-frequency front-end circuits that support multiband and multimode communication should simultaneously transfer a plurality of radio-frequency signals with low loss.

A radio-frequency circuit capable of executing simultaneous transfer for two communication bands includes, for example, a diplexer that includes a low-pass filter having the frequency band group on the low frequency-side as a passband and a high-pass filter having the frequency band group on the high frequency-side as a passband, and a plurality of bandpass filters that are connected to the diplexer and have the respective communication bands as passbands. According to this configuration, it is possible to execute simultaneous transfer in one communication band belonging to the frequency band group on the low frequency-side and another communication band belonging to the frequency band group on the high frequency band (for example, Patent Literature (PTL) 1).

PTL 1: Japanese Unexamined Patent Application Publication No. 2017-17691

BRIEF SUMMARY OF THE INVENTION

For example, in 3GPP, simultaneous transfer of radio-frequency signals of a plurality of different communication systems (for example, the fourth generation mobile communication system and the fifth generation mobile communication system) is proposed. In addition, in this case, simultaneous transfer of radio-frequency signals of the same frequency band group (communication band) in different communication systems is also assumed, and thus it is possible to have a circuit configuration in which a radio-frequency signal of one communication band is transferred in one transfer circuit and a radio-frequency signal of another communication signal is transferred in another transfer circuit.

On the other hand, when the mode of use (also referred to hereafter as use mode) of a portable terminal is different, the communication band to be applied is different. For example, when the region of use (Europe, United States of America, China, Japan, and so on), which is an example of the aforementioned use mode, is different, the communication band is different. However, in a radio-frequency circuit, basic circuit elements other than filters for respective communication bands can be shared. On the other hand, with regard to the filter included in one transfer circuit out of the two transfer circuits included in the radio-frequency circuit, since pass characteristics are different when the communication band is different, it is basically necessary to provide individual signal paths (filters) for respective use modes. Therefore, in configuring the above-described one transfer circuit, manufacturing a common transfer circuit equipped with all the signal paths (filters) that could be used in a plurality of use modes would be more advantageous from the viewpoint of manufacturing efficiency and manufacturing cost than manufacturing a plurality of different transfer circuits for respective use modes.

However, in a transfer circuit that supports a plurality of communication bands and a plurality of use modes, when signal paths (filters) for respective communication bands are individually provided, the number of signal paths (filters) increases as the variation of combinations of communication bands to be simultaneously transferred increases, and thus the increase in size of the radio-frequency circuit that includes two transfer circuits that perform simultaneous transfer becomes an issue.

In view of this, the present disclosure provides a radio-frequency circuit and a communication device that include small transfer circuits that execute simultaneous transfer in different communication systems.

A radio-frequency circuit according to an aspect of the present disclosure is a radio-frequency circuit that is used in simultaneous transfer of a radio-frequency signal of a first communication system and a radio-frequency signal of a second communication system different from the first communication system, and includes: a first transfer circuit configured to receive one of the radio-frequency signal of the first communication system and the radio-frequency signal of the second communication system which are input in a switching manner, and to transfer a radio-frequency signal of a first communication band and a radio-frequency signal of a second communication band, the first communication band including a first transmission band and a first reception band, the second communication band including a second transmission band and a second reception band, wherein the first transmission band and the second transmission band at least partially overlap, and the first transfer circuit includes: a first power amplifier configured to amplify a transmission signal of the first communication band and a transmission signal of the second communication band; and a first transmission filter having a first passband that includes the first transmission band and the second transmission band, the first transmission filter being configured to pass the transmission signal of the first communication band and the transmission signal of the second communication band which are output from the first power amplifier.

The present disclosure is capable of providing a radio-frequency circuit and a communication device that include small transfer circuits that execute simultaneous transfer in different communication systems.

BRIEF DESCRIPTION OF THE DRAWINGS

These and other advantages and features will become apparent from the following description thereof taken in conjunction with the accompanying Drawings, by way of non-limiting examples of embodiments disclosed herein.

DETAILED DESCRIPTION OF THE INVENTION

Figure 1:
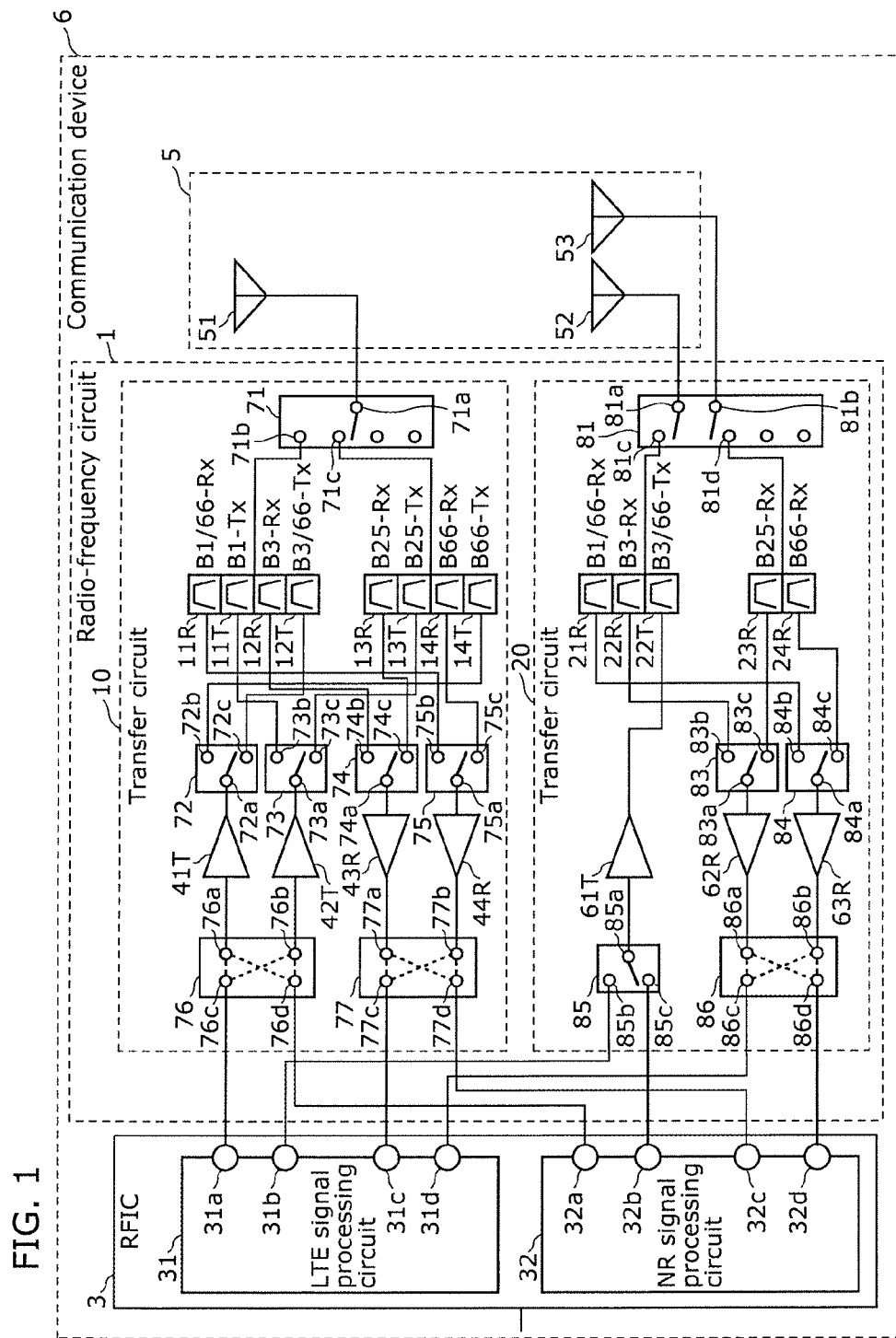
FIG. 1 is an example of a circuit configuration diagram of a radio-frequency circuit and a communication device according to an embodiment.

Hereinafter, exemplary embodiments of the present disclosure will be described in detail with reference to the drawings. It should be noted that each of the subsequently described exemplary embodiments shows a generic or a specific example. The numerical values, shapes, materials, elements, the arrangement and connection of the elements, and others indicated in the following exemplary embodiments are mere examples, and therefore are not intended to limit the present disclosure. Among the elements described in the following exemplary embodiments, elements not recited in any one of the independent claims are described as optional elements. In addition, the sizes of the elements and the ratio of the sizes illustrated in the drawings are not necessarily accurate.

1. CONFIGURATION OF RADIO-FREQUENCY CIRCUIT 1 AND COMMUNICATION DEVICE 6

FIG. 1 is an example of circuit configuration diagram of radio-frequency circuit 1 and communication device 6 according to the embodiment. As illustrated in the figure, communication device 6 includes radio-frequency circuit 1, antenna circuit 5, and RF signal processing circuit (RFIC) 3.

Radio-frequency circuit 1 includes transfer circuits 10 and 20.

Transfer circuit 10 is an example of a second transfer circuit, and transfers, for example, radio-frequency signals of communication bands 1, 3, 25, and 66. Communication bands 1, 3, 25, and 66 are used in both the Evolved Universal Terrestrial Radio Access (E-UTRA) of fourth generation mobile communication system (4G) and New Radio (NR) of fifth generation mobile communication system (5G). 4G is an example of a first communication system and 5G is an example of a second communication system.

It should be noted that in the specification and drawings, the term "communication band A" corresponds to both Band A of 4G-LTE and nA of 5G-NR.

Furthermore, in the specification and drawings, there are instances where E-UTRA is denoted as Long Term Evolution (LTE). It should be noted that the above-mentioned communication band is referred to as a communication band of 4G-LTE, for example.

Transfer circuit 10 includes transmission filters 11T, 12T, 13T, and 14T, reception filters 11R, 12R, 13R, and 14R, power amplifiers 41T and 42T, low-noise amplifiers 43R and 44R, and switches 71, 72, 73, 74, 75, 76, and 77.

Transmission filter 11T has, as a passband, a transmission band (from 1920 MHz to 1980 MHz) of communication band 1. Transmission filter 11T is connected between selection terminal 71b of switch 71 and selection terminal 73b of switch 73.

Reception filter 11R has, as a passband, a band that includes a reception band (from 2110 MHz to 2170 MHz) of communication band and a reception band (from 2110 MHz to 2200 MHz) of communication band 66. It should be noted that the reception band of communication band 1 and the reception band of communication band 66 overlap at least partially. Reception filter 11R is connected between selection terminal 71b of switch 71 and selection terminal 75b of switch 75. It should be noted that, depending on the region of use, communication band 66 becomes communication band 4 (a reception band from 2110 MHz to 2155 MHz).

Transmission filter 12T has, as a passband, a transmission band (from 1710 MHz to 1785 MHz) of communication band 3. It should be noted that the passband of transmission filter 12T includes the transmission band (from 1710 MHz to 1780 MHz) of communication band 66. The output end of transmission filter 12T is connected to selection terminal 71b of switch 71, and the input end of transmission filter 12T is connected to selection terminal 72c of switch 72. It should be noted that, depending on the region of use, communication band 66 becomes communication band 4 (a transmission band from 1710 MHz to 1755 MHz).

Reception filter 12R has, as a passband, a reception band (from 1805 MHz to 1880 MHz) of communication band 3. Reception filter 12R is connected between selection terminal 71b of switch 71 and selection terminal 74b of switch 74.

Transmission filters 11T and 12T and reception filters 11R and 12R are included in a first multiplexer that demultiplexes and multiplexes radio-frequency signals of communication bands 1, 3, and 66. According to this configuration, the radio-frequency signals of communication bands 1, 3, and 66 can be demultiplexed and multiplexed using the frequency division duplex (FDD) method.

Transmission filter 13T has, as a passband, a transmission band (from 1850 MHz to 1915 MHz) of communication band 25. Transmission filter 13T is connected between selection terminal 71c of switch 71 and selection terminal 73c of switch 73. It should be noted that, depending on the region of use, communication band 25 becomes communication band 2 (a transmission band from 1850 MHz to 1910 MHz).

Reception filter 13R has, as a passband, a reception band (from 1930 MHz to 1995 MHz) of communication band 25. Transmission filter 13R is connected between selection terminal 71c of switch 71 and selection terminal 74c of switch 74. It should be noted that, depending on the region of use, communication band 25 becomes communication band 2 (a reception band from 1930 MHz to 1990 MHz).

Transmission filter 14T has, as a passband, a transmission band (from 1710 MHz to 1780 MHz) of communication band 66. Transmission filter 14T is connected between selection terminal 71c of switch 71 and selection terminal 72b of switch 72.

Reception filter 14R has, as a passband, the reception band (from 2110 MHz to 2200 MHz) of communication band 66. Transmission filter 14R is connected between selection terminal 71c of switch 71 and selection terminal 75c of switch 75.

Transmission filters 13T and 14T and reception filters 13R and 14R are included in a second multiplexer that demultiplexes and multiplexes radio-frequency signals of communication bands 25 and 66. According to this configuration, the radio-frequency signals of communication bands 25 and 66 can be demultiplexed and multiplexed using the FDD method.

Power amplifier 41T amplifies radio-frequency signals (hereafter referred to as transmission signals) of transmission bands of communication bands 3 and 66. Power amplifier 41T is connected between switch 76 and switch 72.

Power amplifier 42T amplifies transmission signals of transmission bands of communication bands 1 and 25. Power amplifier 42T is connected between switch 76 and switch 73.

Low-noise amplifier 43R amplifies radio-frequency signals (hereafter referred to as reception signals) of reception bands of communication bands 3 and 25. Low-noise amplifier 43R is connected between switch 74 and switch 77.

Low-noise amplifier 44R amplifies reception signals of reception bands of communication bands 1 and 66. Low-noise amplifier 44R is connected between switch 75 and switch 77.

Switch 71 includes common terminal 71a and selection terminals 71b and 71c, and switches between connecting common terminal 71a and selection terminal 71b and connecting common terminal 71a and selection terminal 71c. Common terminal 71a is connected to antenna 51, selection terminal 71b is connected to a common terminal of the first multiplexer, and selection terminal 71c is connected to a common terminal of the second multiplexer. According to the above-described configuration, switch 71 switches between connecting antenna 51 and the first multiplexer and connecting antenna 51 and the second multiplexer.

Switch 72 includes common terminal 72a and selection terminals 72b and 72c, and switches between connecting common terminal 72a and selection terminal 72b and connecting common terminal 72a and selection terminal 72c. Common terminal 72a is connected to the output terminal of power amplifier 41T. According to the above-described configuration, switch 72 switches between connecting power amplifier 41T and transmission filter 14T and connecting power amplifier 41T and transmission filter 12T.

Switch 73 includes common terminal 73a and selection terminals 73b and 73c, and switches between connecting common terminal 73a and selection terminal 73b and connecting common terminal 73a and selection terminal 73c. Common terminal 73a is connected to the output terminal of power amplifier 42T. According to the above-described configuration, switch 73 switches between connecting power amplifier 42T and transmission filter 11T and connecting power amplifier 42T and transmission filter 13T.

Switch 74 includes common terminal 74a and selection terminals 74b and 74c, and switches between connecting common terminal 74a and selection terminal 74b and connecting common terminal 74a and selection terminal 74c. Common terminal 74a is connected to the input terminal of low-noise amplifier 43R. According to the above-described configuration, switch 74 switches between connecting low-noise amplifier 43R and reception filter 12R and connecting low-noise amplifier 43R and reception filter 13R.

Switch 75 includes common terminal 75a and selection terminals 75b and 75c, and switches between connecting common terminal 75a and selection terminal 75b and connecting common terminal 75a and selection terminal 75c. Common terminal 75a is connected to the input terminal of low-noise amplifier 44R. According to the above-described configuration, switch 75 switches between connecting low-noise amplifier 44R and reception filter 11R and connecting low-noise amplifier 44R and reception filter 14R.

Switch 76 includes terminals 76a, 76b, 76c, and 76d. Terminal 76a is connected to the input terminal of power amplifier 41T, and terminal 76b is connected to the input terminal of power amplifier 42T. Furthermore, terminal 76c is connected to LTE terminal 31a of RFIC 3, and terminal 76d is connected to NR terminal 32a of RFIC 3.

According to the above-described configuration, switch 76 switches between connecting power amplifier 41T and LTE terminal 31a and connecting power amplifier 41T and NR terminal 32a, and switches between connecting power amplifier 42T and LTE terminal 31a and connecting power amplifier 42T and NR terminal 32a.

Switch 77 includes terminals 77a, 77b, 77c, and 77d. Terminal 77a is connected to the output terminal of low-noise amplifier 43R, and terminal 77b is connected to the output terminal of low-noise amplifier 44R. Furthermore, terminal 77c is connected to LTE terminal 31c of RFIC 3, and terminal 77d is connected to NR terminal 32c of RFIC 3.

According to the above-described configuration, switch 77 switches between connecting low-noise amplifier 43R and LTE terminal 31c and connecting low-noise amplifier 43R and NR terminal 32c, and switches between connecting low-noise amplifier 44R and LTE terminal 31c and connecting low-noise amplifier 44R and NR terminal 32c.

According to the above-described configuration of transfer circuit 10, transfer circuit 10 can execute the transmission and reception of the radio-frequency signals of Band 1, Band 3, Band 25, and Band 66 of 4G-LTE, and the transmission and reception of the radio-frequency signals of n1, n3, n25, and n66 of 5G-NR. In addition, the second multiplexer enables transmission and reception carrier aggregation (CA) of Band 25 and Band 66 of 4G-LTE and transmission and reception CA of n25 and n66 of 5G-NR.

Power amplifiers 41T and 42T and low-noise amplifiers 43R and 44R are configured using, for example, a Si-based complementary metal-oxide-semiconductor (CMOS), a field-effect transistor (FET) or a heterojunction bipolar transistor (HBT) which has GaAs as a material, or the like.

In transfer circuit 10, low-power amplifiers 43R and 44R may be formed on a single semiconductor integrated circuit (IC). In addition, the semiconductor IC may include power amplifiers 41T and 42T. The semiconductor IC is, for example, configured using a CMOS. Specifically, the semiconductor IC is configured using a silicon-on-insulator (SOI) structure. According to this configuration, the semiconductor IC can be manufactured at low cost. It should be noted that the semiconductor IC may include at least one of GaAs, SiGe, or GaN. According to this, radio-frequency signals having high quality amplification performance and noise performance can be output.

It should be noted that the circuit elements included in transfer circuit 10 may be mounted on the same mounting board.

Transfer circuit 20 is an example of a first transfer circuit, and transfers, for example, radio-frequency signals of communication bands 1, 3, 25, and 66. Communication bands 1, 3, 25, and 66 are used in both 4G-LTE and 5G-NR.

Transfer circuit 20 includes transmission filter 22T, reception filters 21R, 22R, 23R, and 24R, power amplifier 61T, low-noise amplifiers 62R and 63R, and switches 81, 83, 84, 85, and 86.

Transmission filter 22T is an example of a first transmission filter, and has, as a passband (a first passband), a transmission band (a first transmission band from 1710 MHz to 1785 MHz) of communication band 3 (a first communication band). It should be noted that the passband of transmission filter 22T includes the transmission band (a second transmission band from 1710 MHz to 1780 MHz) of communication band 66 (a second communication band). Specifically, transmission filter 22T has a transmission band that includes the transmission band of communication band 3 and the transmission band of communication 66, and passes transmission signals of communication band 3 and transmission signals of communication band 66 which are output from power amplifier 61T. Transmission filter 22T is connected between selection terminal 81c of switch 81 and the output terminal of power amplifier 61T.

Reception filter 21R is an example of a second reception filter, and has, as a passband, a band that includes a reception band (a third reception band from 2110 MHz to 2170 MHz) of communication band 1 (a third communication band) and a reception band (a second reception band from 2110 MHz to 2200 MHz) of communication band 66 (a second communication band). It should be noted that the reception band of communication band 1 and the reception band of communication band 66 overlap at least partially. Transmission filter 21R is connected between selection terminal 81c of switch 81 and selection terminal 84b of switch 84.

Reception filter 22R has, as a passband, a reception band (a first reception band from 1805 MHz to 1880 MHz) of communication band 3 (a first communication band). Transmission filter 22R is connected between selection terminal 81c of switch 81 and selection terminal 83b of switch 83.

Transmission filter 22T and reception filters 21R and 22R are included in a third multiplexer that demultiplexes and multiplexes radio-frequency signals of communication bands 1, 3, and 66. According to this configuration, the radio-frequency signals of communication bands 1, 3 and 66 can be demultiplexed and multiplexed using the FDD method.

Reception filter 23R has, as a passband, a reception band (from 1930 MHz to 1995 MHz) of communication band 25. Transmission filter 23R is connected between selection terminal 81d of switch 81 and selection terminal 83c of switch 83.

Reception filter 24R has, as a passband, the reception band (from 2110 MHz to 2200 MHz) of communication band 66. Transmission filter 24R is connected between selection terminal 81d of switch 81 and selection terminal 84c of switch 84.

Reception filters 23R and 24R are included in a fourth multiplexer that demultiplexes radio-frequency signals of communication bands 25 and 66. According to this configuration, the radio-frequency signals of communication bands 25 and 66 can be demultiplexed and multiplexed using the FDD method.

It should be noted that, in this embodiment, the communication bands having overlapping transmission bands and the communication bands having overlapping reception bands both have communication band 66 in common, but are not limited to such. Specifically, the transmission band of a first communication band and the transmission band of a second communication band may at least partially overlap, and the transmission band of a third communication band and the transmission band of a fourth communication band may at least partially overlap. At this time, the first communication band, the second communication band, the third communication band, and the fourth communication band may have mutually different frequency bands.

Power amplifier 61T is an example of a first power amplifier, and amplifies transmission signals of transmission bands of communication bands 3 and 66. Power amplifier 61T is connected between switch 85 and transmission filter 22T.

Low-noise amplifier 62R amplifies reception signals of reception bands of communication bands 3 and 25. Low-noise amplifier 62R is connected between switch 83 and switch 86.

Low-noise amplifier 63R amplifies reception signals of reception bands of communication bands 1 and 66. Low-noise amplifier 63R is connected between switch 84 and switch 86.

Switch 81 includes common terminals 81a and 81b and selection terminals 81c and 81d, switches between connecting common terminal 81a and selection terminal 81c and connecting common terminal 81a and selection terminal 81d, and switches between connecting common terminal 81b and selection terminal 81c and connecting common terminal 81b and selection terminal 81d. Common terminal 81a is connected to antenna 52, common terminal 81b is connected to antenna 53, selection terminal 81c is connected to a common terminal of the third multiplexer, and selection terminal 81d is connected to a common terminal of the fourth multiplexer. According to the above-described configuration, switch 81 switches between connecting antenna 52 and the third multiplexer and connecting antenna 52 and the fourth multiplexer, and switches between connecting antenna 53 and the third multiplexer and connecting antenna 53 and the fourth multiplexer.

Switch 83 includes common terminal 83a and selection terminals 83b and 83c, and switches between connecting common terminal 83a and selection terminal 83b and connecting common terminal 83a and selection terminal 83c. Common terminal 83a is connected to the input terminal of low-noise amplifier 62R. According to the above-described configuration, switch 83 switches between connecting low-noise amplifier 62R and reception filter 22R and connecting low-noise amplifier 62R and reception filter 23R.

Switch 84 includes common terminal 84a and selection terminals 84b and 84c, and switches between connecting common terminal 84a and selection terminal 84b and connecting common terminal 84a and selection terminal 84c. Common terminal 84a is connected to the input terminal of low-noise amplifier 63R. According to the above-described configuration, switch 84 switches between connecting low-noise amplifier 63R and reception filter 21R and connecting low-noise amplifier 63R and reception filter 24R.

Switch 85 includes common terminal 85a and selection terminals 85b and 85c, and switches between connecting common terminal 85a and selection terminal 85b and connecting common terminal 85a and selection terminal 85c. Common terminal 85a is connected to the input terminal of power amplifier 61T, selection terminal 85b is connected to LTE terminal 31b of RFIC 3, and selection terminal 85c is connected to NR terminal 32b of RFIC 3.

According to the above-described configuration, switch 85 switches between connecting power amplifier 61T and LTE terminal 31b and connecting power amplifier 61T and NR terminal 32b.

Switch 86 includes terminals 86a, 86b, 86c, and 86d. Terminal 86a is connected to the output terminal of low-noise amplifier 62R, and terminal 86b is connected to the output terminal of low-noise amplifier 63R. Furthermore, terminal 86c is connected to LTE terminal 31d of RFIC 3, and terminal 86d is connected to NR terminal 32d of RFIC 3.

According to the above-described configuration, switch 86 switches between connecting low-noise amplifier 62R and LTE terminal 31d and connecting low-noise amplifier 62R and NR terminal 32d, and switches between connecting low-noise amplifier 63R and LTE terminal 31d and connecting low-noise amplifier 63R and NR terminal 32d.

Switches 85 and 86 are examples of a first switch circuit, and switch between transferring of radio-frequency signal of 4G-LTE by transfer circuit 20 and transferring of radio-frequency signals of 5G-NR by transfer circuit 20.

With regard to the simultaneous transfer of radio-frequency signals of 4G-LTE and radio-frequency signals of 5G-NR, transfer circuit 20 can, through the switching by switches 85 and 86, transfer radio-frequency signals of either 4G-LTE or 5G-NR.

In addition, switches 76, 77, 85, and 86 are examples of a second switch circuit, and exclusively switch between the transferring of one of radio-frequency signals of 4G-LTE and radio-frequency signals of 5G-NR by transfer circuit 20, and transferring of the other of radio-frequency signals of 4G-LTE and radio-frequency signals of 5G-NR by transfer circuit 10.

Switches 76, 77, 85, and 86 enable the effective execution of simultaneous transfer of radio-frequency signal of different communication systems by transfer circuit 10 and transfer circuit 20.

According to the above-described configuration of transfer circuit 20, transfer circuit 20 can execute the transmission of the radio-frequency signals of Band 3 and Band 66 of 4G-LTE, the reception of the radio-frequency signals of Band 1, Band 3, Band 25, and Band 66 of 4G-LTE, the transmission of the radio-frequency signals of n3 and n66 of 5G-NR, and the reception of the radio-frequency signals of n1, n3, n25, and n66 of 5G-NR. In addition, the fourth multiplexer enables reception CA of Band 25 and Band 66 of 4G-LTE and reception CA of n25 and n66 of 5G-NR.

Power amplifier 61T and low-noise amplifiers 62R and 63R are configured using, for example, a Si-based CMOS, a FET or HBT having GaAs as a material, or the like.

In transfer circuit 20, low-power amplifiers 62R and 63R may be formed on a single semiconductor IC. In addition, the semiconductor IC may further include power amplifier 61T. The semiconductor IC is, for example, configured using a CMOS. Specifically, the semiconductor IC is configured using an SOI structure. According to this configuration, the semiconductor IC can be manufactured at low cost. It should be noted that the semiconductor IC may include at least one of GaAs, SiGe, or GaN. According to this, radio-frequency signals having high quality amplification performance and noise performance can be output.

It should be noted that the circuit elements included in transfer circuit 20 may be mounted on the same mounting board.

Furthermore, in radio-frequency circuit 1 according to this embodiment, transfer circuit 10 and transfer circuit 20 may be mounted on the same mounting board. In this case, radio-frequency circuit 1 can be miniaturized.

Furthermore, in radio-frequency circuit 1 according to this embodiment, transfer circuit 10 and transfer circuit 20 may be mounted on different mounting boards. In this case, it is possible to improve the isolation characteristics between the transmission signals transferred by transfer circuit 10 and the transmission signals transferred by transfer circuit 20.

According to the above-described configuration of transfer circuits 10 and 20, radio-frequency circuit 1 can simultaneously transfer radio-frequency signals of a first communication system and radio-frequency signals of a second communication system different from the first communication system. It should be noted the first communication system and the second communication system are systems of different communication standards. The first communication system is, for example, the fourth generation mobile communication system (4G), and the second communication system is, for example, the fifth generation mobile communication system (5G).

Figure 2:
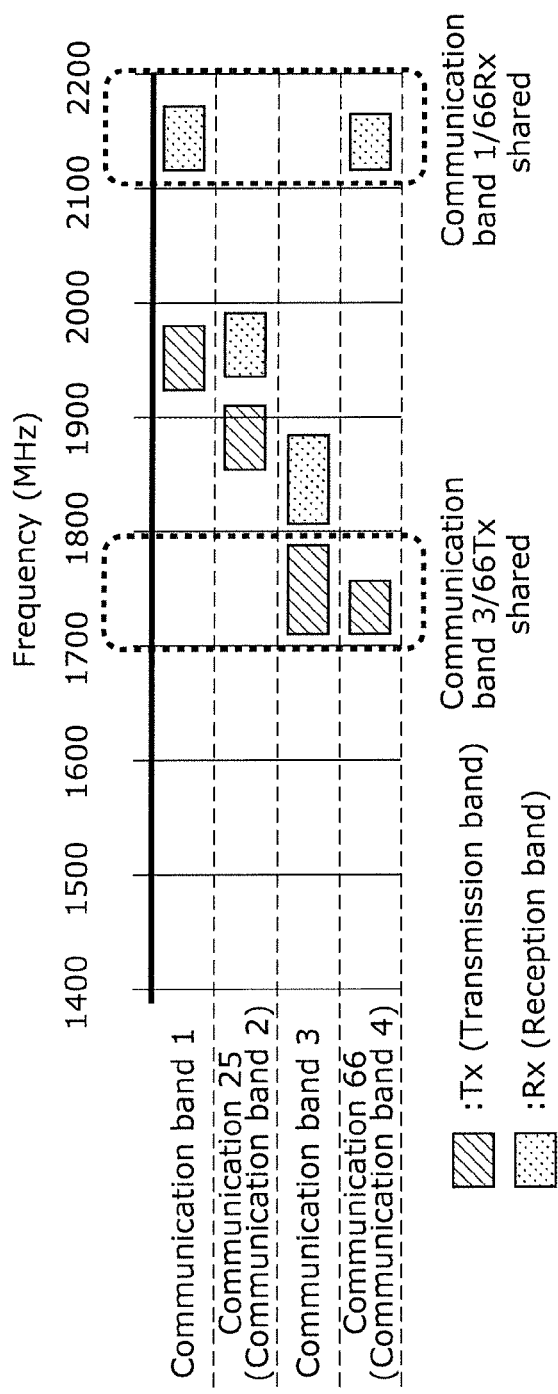
FIG. 2 is a diagram illustrating the frequency relationship of communication bands applied to the radio-frequency circuit according to the embodiment.

FIG. 2 is a diagram illustrating the frequency relationship of communication bands applied to radio-frequency circuit 1 according to the embodiment. As illustrated in FIG. 2, communication bands 1, 25, 3, and 66 each have a transmission band (Tx) and a reception band (Rx). Here, the transmission band (the first transmission band) of communication band 3 includes the transmission band (the second transmission band) of communication band 66, and the reception band (the third reception band) of communication band 1 partially overlaps with the reception band (the second reception band) of communication band 66.

In addition, the transmission band of communication band 25 and the reception band of communication band 3 have partially overlapping frequencies, and the transmission band of communication band 1 and the reception band of communication band 25 have partially overlapping frequencies.

Radio-frequency circuit 1 according to this embodiment includes filters that pass radio-frequency signals of communication bands 1, 25, 3, and 66 having the above-described frequency relationship, and switches that switch between the signal paths of the respective communication bands.

Radio-frequency circuit 1 according to this embodiment can execute simultaneous transmission, simultaneous reception, and simultaneous transmission and reception of the radio-frequency signals of communication band 3 (the first communication band) and the radio-frequency signals of communication band 1 (the third communication band). Furthermore, radio-frequency circuit 1 according to this embodiment can execute simultaneous transmission, simultaneous reception, and simultaneous transmission and reception of the radio-frequency signals of communication band 66 (the second communication band) (or communication band 4) and the radio-frequency signals of communication band 25 (or communication band 2). Communication bands 3 and 1 are used, for example, in a first region, and communication bands 66 and 25 are used, for example, in a second region.

It should be noted that a state of simultaneously transmitting, simultaneously receiving, or simultaneously transmitting and receiving the radio-frequency signals of communication band 3 and the radio-frequency signals of communication band 1, and not simultaneously transmitting, simultaneously receiving, or simultaneously transmitting and receiving the radio-frequency signals of communication band 66 and the radio-frequency signals of communication band 25 is defined as a first mode. Furthermore, a state of not simultaneously transmitting, simultaneously receiving, or simultaneously transmitting and receiving the radio-frequency signals of communication band 3 and the radio-frequency signals of communication band 1, and simultaneously transmitting, simultaneously receiving, or simultaneously transmitting and receiving the radio-frequency signals of communication band 66 and the radio-frequency signals of communication band 25 is defined as a second mode.

In this embodiment, the first mode is used, for example, in the first region, and the second mode is used, for example, in the second region. However, the first mode and the second mode are not limited to being modes that are used in different regions, and may be different modes used in the same region.

Antenna circuit 5 includes antennas 51, 52, and 53. Antenna 51 is connected to common terminal 71*a* of transfer circuit 10, and transmits and receives radio-frequency signals. Antenna 52 is connected to common terminal 81*a* of transfer circuit 20, and transmits and receives radio-frequency signals. Antenna 53 is connected to common terminal 81*b* of transfer circuit 20, and transmits and receives radio-frequency signals.

It should be noted that in radio-frequency circuit 1 according to this embodiment, transfer circuits 10 and 20 are connected to different antennas. According to this configuration, the radio-frequency signals transferred by transfer circuit 10 and the radio-frequency signals transferred by transfer circuit 20 are transferred using different antennas, and thus the isolation of the two radio-frequency signals is improved.

RFIC 3 is an RF signal processing circuit that processes a radio-frequency signal. Specifically, RFIC 3 performs, by upconversion, and the like, signal processing on a transmission signal input from a baseband signal processing circuit (not illustrated in the figure), and outputs the radio-frequency transmission signal generated by the signal processing to transfer circuits 10 and 20. RFIC 3 includes LTE signal processing circuit 31 and NR signal processing circuit 32.

LTE signal processing circuit 31 includes LTE terminals 31*a*, 31*b*, 31*c*, and 31*d*, and processes radio-frequency signals of 4G-LTE. Specifically, LTE signal processing circuit 31 receives, through LTE terminal 31*c*, input of reception signals of 4G-LTE transferred by antenna circuit 5 and transfer circuit 10, and receives, through LTE terminal 31*d*, input of reception signals of 4G-LTE transferred by antenna circuit 5 and transfer circuit 20. Furthermore, LTE signal processing circuit 31 generates radio-frequency signals of 4G-LTE and outputs the radio-frequency signals from LTE terminal 31*a* to transfer circuit 10, and generates radio-frequency signals of 4G-LTE and outputs the radio-frequency signals from LTE terminal 31*b* to transfer circuit 20.

NR signal processing circuit 32 includes NR terminals 32*a*, 32*b*, 32*c*, and 32*d*, and processes radio-frequency signals of 5G-NR. Specifically, NR signal processing circuit 32 receives, through NR terminal 32*c*, input of reception signals of 5G-NR transferred by antenna circuit 5 and transfer circuit 10, and receives, through NR terminal 32*d*, input of reception signals of 5G-NR transferred by antenna circuit 5 and transfer circuit 20. Furthermore, NR signal processing circuit 32 generates radio-frequency signals of 5G-NR and outputs the radio-frequency signals from NR terminal 32*a* to transfer circuit 10, and generates radio-frequency signals of 5G-NR and outputs the radio-frequency signals from NR terminal 32*b* to transfer circuit 20.

Furthermore, RFIC 3 includes a controller that outputs a control signal for switching the connection state of switches 71 to 77 and switches 81 to 86, to the switches, based on the combination of the communication system and communication band of the radio-frequency signal to be transferred by radio-frequency circuit 1.

It should be noted that in communication device 6 according to this embodiment, antenna circuit 5 is not necessarily an essential element.

According to the above-described configuration, either radio-frequency signals of 4G-LTE or radio-frequency signals of 5G-NR are input from RFIC 3 to transfer circuit 10 by switching. Furthermore, either radio-frequency signals of 4G-LTE or radio-frequency signals of 5G-NR are input from RFIC 3 to transfer circuit 20 by switching.

According to the above-described configuration of transfer circuit 20, the transfer of transmission signals of two bands, communication band 3 and communication band 66, that have at least partially overlapping frequencies can be realized by sharing the single power amplifier 61T and the single transmission filter 22T. Accordingly, since circuit elements included in transfer circuit 20 can be reduced, radio-frequency circuit 1 can be miniaturized.

Figure 3:
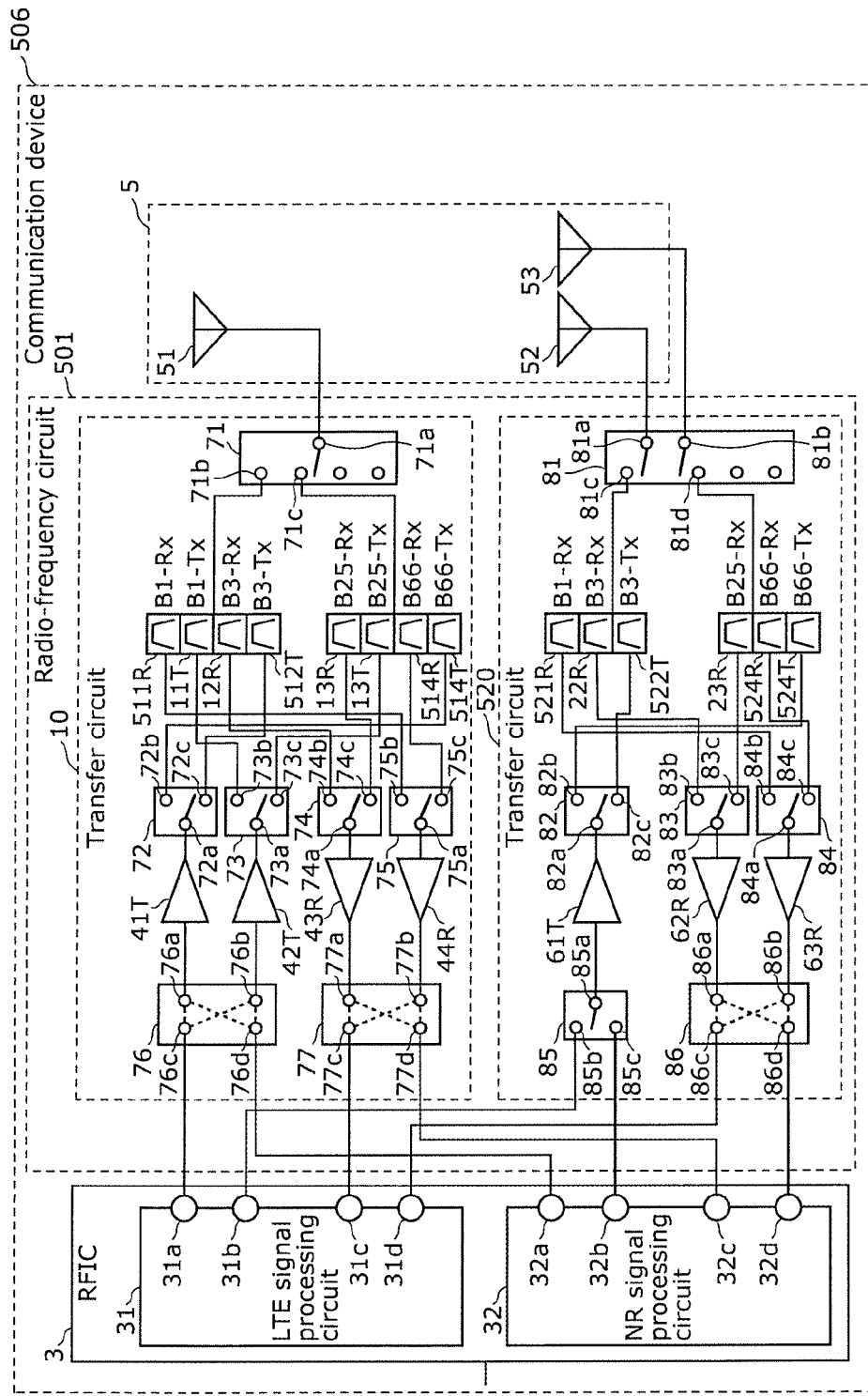
FIG. 3 is an example of a circuit configuration diagram of a radio-frequency circuit and a communication device according to a comparative example.

FIG. 3 is an example of a circuit configuration diagram of radio-frequency circuit 501 and communication device 506 according to a comparative example. As illustrated in the figure, communication device 506 includes radio-frequency circuit 501, antenna circuit 5, and RFIC 3. Radio-frequency circuit 501 and communication device 506 are comparative examples for radio-frequency circuit 1 and communication device 6 according to the embodiment. Compared to communication device 6 according to the embodiment, communication device 506 according to the comparative example is different in the configuration of radio-frequency circuit 501. Hereinafter, description of communication device 506 according to this comparative example will omit the elements that are the same as in communication device 6 according to the embodiment and will focus on those elements that are different.

Radio-frequency 501 includes transfer circuits 10 and 520. Compared to radio-frequency circuit 1 according to the embodiment, radio-frequency circuit 501 according to the comparative example is different in the configuration of transfer circuit 520. Hereinafter, description of radio-frequency circuit 501 according to this comparative example will omit the elements that are the same as in radio-frequency circuit 1 according to the embodiment and will focus on those elements that are different.

Transfer circuit 520 transfers radio-frequency signals of communication bands 1, 3, 25, and 66. Communication bands 1, 3, 25, and 66 are used in both 4G-LTE and 5G-NR.

Transfer circuit 520 includes transfer filters 522T and 524T, reception filters 521R, 22R, 23R, and 524R, power amplifier 61T, low-noise amplifiers 62R and 63R, and switches 81, 82, 83, 84, 85, and 86.

Transmission filter 522T has, as a passband, the transmission band of communication band 3. The output terminal of transmission filter 522T is connected to selection terminal 81*c* of switch 81, and the input terminal of transmission filter 522T is connected to selection terminal 82*c* of switch 82.

Reception filter 521R has, as a passband, the reception band of communication band 1. The input terminal of reception filter 521R is connected to selection terminal 81*c* of switch 81, and the output terminal of reception filter 521R is connected to selection terminal 84*b* of switch 84.

Reception filter 22R has, as a passband, the reception band of communication band 3. The input terminal of reception filter 22R is connected to selection terminal 81*c* of switch 81, and the output terminal of reception filter 22R is connected to selection terminal 83*b* of switch 83.

Reception filter 23R has, as a passband, the reception band of communication band 25. The input terminal of reception filter 23R is connected to selection terminal 81*d* of switch 81, and the output terminal of reception filter 23R is connected to selection terminal 83*c* of switch 83.

Reception filter 524R has, as a passband, the reception band of communication band 66. The input terminal of reception filter 524R is connected to selection terminal 81*d* of switch 81, and the output terminal of reception filter 524R is connected to selection terminal 84c of switch 84.

Power amplifier 61T amplifies transmission signals of the transmission bands of communication bands 3 and 66. Power amplifier 61T is connected between switch 85 and switch 82.

Low-noise amplifier 62R amplifies reception signals of the reception bands of communication bands 3 and 25. Low-noise amplifier 62R is connected between switch 83 and switch 86.

Low-noise amplifier 63R amplifies reception signals of the reception bands of communication bands 1 and 66. Low-noise amplifier 63R is connected between switch 84 and switch 86.

Switches 81, 83, 84, 85, and 86 of transfer circuit 520 according to the comparative example and switches 81, 83, 84, 85, and 86 of transfer circuit 20 according to the embodiment have the same connection configuration, and thus description will be omitted here.

Switch 82 includes common terminal 82a and selection terminals 82b and 82c, and switches between connecting common terminal 82a and selection terminal 82b and connecting common terminal 82a and selection terminal 82c. Common terminal 82a is connected to the output terminal of power amplifier 61T. According to the above-described configuration, switch 82 switches between connecting power amplifier 61T and transmission filter 524T and connecting power amplifier 61T and transmission filter 522T.

According to the above-described configuration of transfer circuit 520, transfer circuit 520, like transfer circuit 20, can execute the transmission of the radio-frequency signals of Band 3 and Band 66 of 4G-LTE, the reception of the radio-frequency signals of Band 1, Band 3, Band 25, and Band 66 of 4G-LTE, the transmission of the radio-frequency signals of n3 and n66 of 5G-NR, and the reception of the radio-frequency signals of n1, n3, n25, and n66 of 5G-NR. In addition, reception CA of Band 25 and Band 66 of 4G-LTE and reception CA of n25 and n66 of 5G-NR is possible.

According to the above-described configuration of radio-frequency circuit 501 according to the comparative example, circuit elements such as amplifiers and filters for the communication bands are required in transfer circuit 520. Specifically, transmission filter 522T that passes the transmission signals of the transmission band of communication band 3 and transmission filter 524T passes the transmission signals of the transmission band of communication band 66 are provided individually. As in transfer circuit 520 according to the comparative example, when circuit elements are provided for respective communication bands, the number of circuit elements increases correspondingly with an increase in communication bands, and thus radio-frequency circuit 501 increases in size.

In contrast, in radio-frequency circuit 1 according to this embodiment, transmission filter 22T is shared, in transfer circuit 20, as a filter for communication band 3 and communication band 66 which are in an overlapping frequency relationship. According to this configuration, compared to radio-frequency circuit 501 according to the comparative example, transmission filter 524T and switch 82 are eliminated in radio-frequency circuit 1 according to this embodiment. Accordingly, since circuit elements included in transfer circuit 20 can be reduced, radio-frequency circuit 1 can be miniaturized.

It should be noted that in radio-frequency circuit 1 according to this embodiment, transfer circuit 20 includes reception paths for transferring reception signals and a transmission path for transferring transmission signals. Specifically, transfer circuit 20 includes, as reception paths, (1) the reception path on which reception filter 21R is disposed, (2) the reception path on which reception filter 22R is disposed, (3) the reception path on which reception filter 23R is disposed, and (4) the reception path on which reception filter 24R is disposed. Furthermore, transfer circuit 20 includes, as a transmission path, (1) the transmission path on which transmission filter 22T is disposed.

Here, in transfer circuit 20, the number of transmission paths (4 paths) is larger than the number of transmission paths (1 path).

According to the configuration, transfer circuit 20 which supports simultaneous transfer of radio-frequency signals of different communication systems (for example, 4G and 5G) can also be used as a diversity circuit having a reception function.

Furthermore, in radio-frequency circuit 1 according to this embodiment, transfer circuit 10 includes reception paths for transferring reception signals and transmission paths for transferring transmission signals. Specifically, transfer circuit 10 includes, as reception paths, (1) the reception path on which reception filter 11R is disposed, (2) the reception path on which reception filter 12R is disposed, (3) the reception path on which reception filter 13R is disposed, and (4) the reception path on which reception filter 14R is disposed. Furthermore, transfer circuit 10 includes, as transmission paths, (1) the reception path on which transmission filter 11T is disposed, (2) the reception path on which transmission filter 12T is disposed, (3) the reception path on which transmission filter 13T is disposed, and (4) the reception path on which transmission filter 14T is disposed.

Here, the number of transmission paths (5 paths) included in transfer circuit 20 is smaller than the number of transmission paths (8 paths) included in transfer circuit 10.

Transfer circuit 20 includes reception paths for the communication bands of the transmission paths included in transfer circuit 10 but does not include all of the transmission paths for the communication bands of the transmission paths included in transfer circuit 10. Specifically, transfer circuit 20 can function as a circuit that supports EN-DC while functioning as a diversity circuit of transfer circuit 10.

2. CIRCUIT STATE OF RADIO-FREQUENCY CIRCUIT 1 IN EN-DC

Radio-frequency circuit 1 having the above-described configuration can simultaneously transfer radio-frequency signals of 4G and radio-frequency signals of 5G. Radio-frequency circuit 1 can (1) simultaneously execute the transmission and reception of radio-frequency signals of Band 2 (Band 25) of 4G-LTE by transfer circuit 10 and the transmission and reception of radio-frequency signals of n66 of 5G-NR by transfer circuit 20 (i.e., execute first E-UTRA New Radio Dual Connectivity (EN-DC)), and (2) simultaneously execute the transmission and reception of radio-frequency signals of Band 3 of 4G-LTE by transfer circuit 20 and the transmission and reception of radio-frequency signals of n3 of 5G-NR by transfer circuit 10 (i.e., execute second EN-DC).

Figure 4:
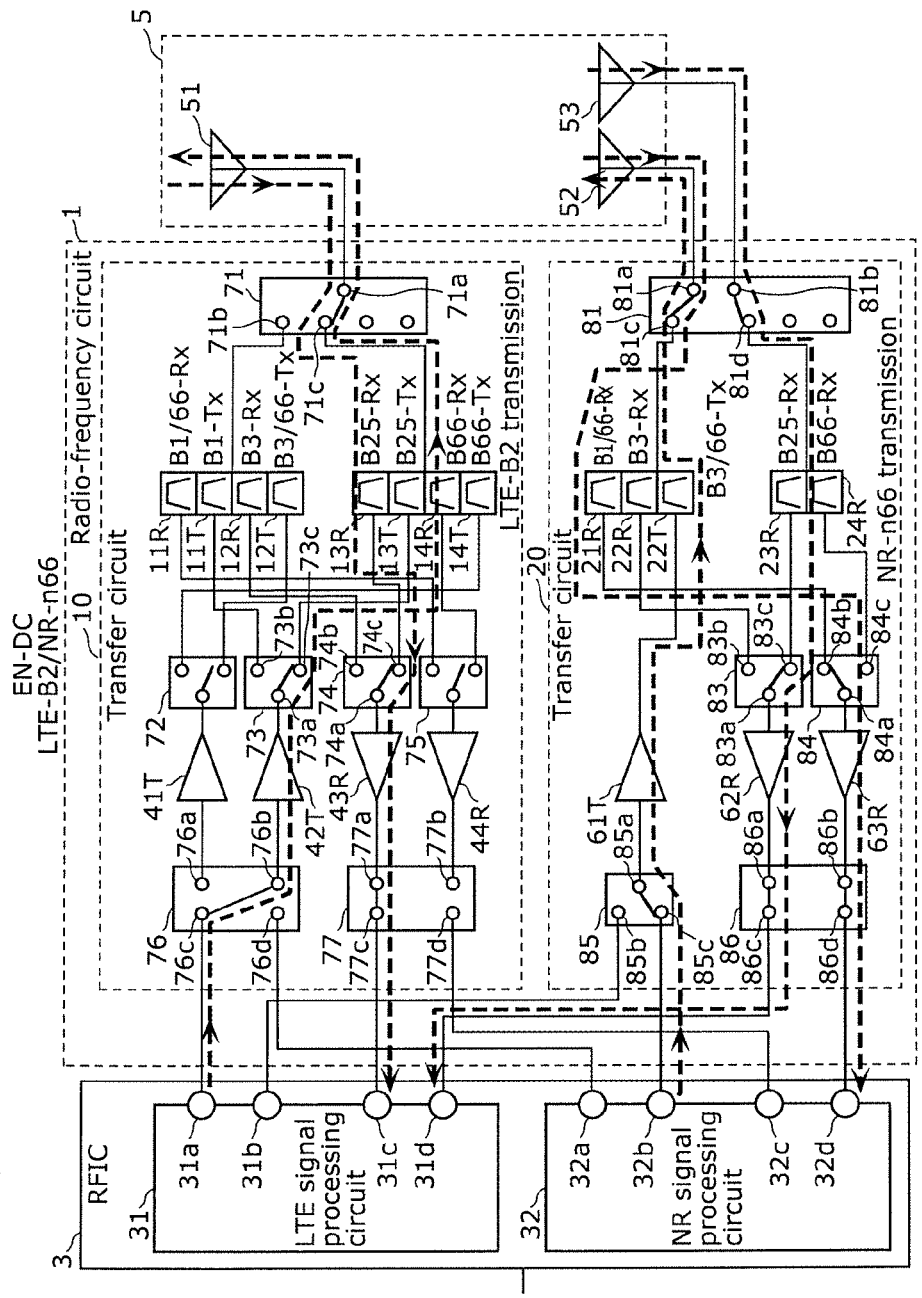
FIG. 4 is a circuit diagram illustrating the signal flow in a first EN-DC of the radio-frequency circuit according to the embodiment.

FIG. 4 is a circuit diagram illustrating the signal flow in the second EN-DC of radio-frequency circuit 1 according to the embodiment. The figure illustrates the circuit state and flow of signals in the first EN-DC of (1) the transmission and reception of radio-frequency signals of Band 2 (Band 25) of 4G-LTE by transfer circuit 10 and the transmission and reception of radio-frequency signals of n66 of 5G-NR by transfer circuit 20.

In executing the first EN-DC, RFIC 3 controls the connection state of the respective switches of radio-frequency circuit 1 to cause transfer circuit 10 to transfer radio-frequency signals of Band 2 of 4G-LTE and cause transfer circuit 20 to transfer radio-frequency signals of n66 of 5G-NR.

Specifically, the controller of RFIC 3 connects terminal 76c and terminal 76b in switch 76, connects common terminal 73a and selection terminal 73c in switch 73, and connects common terminal 71a and selection terminal 71c in switch 71. In this state, RFIC 3 outputs the transmission signals of Band 2 of 4G-LTE, from LTE terminal 31a to transfer circuit 10. At this time, the transmission signals of Band 2 of 4G-LTE that are output from LTE terminal 31a sequentially pass through switch 76, power amplifier 42T, switch 73, transmission filter 13T, and switch 71, and are then transmitted from antenna 51.

Furthermore, the controller of RFIC 3 connects terminal 77a and terminal 77c in switch 77, connects common terminal 74a and selection terminal 74c in switch 74, and connects common terminal 71a and selection terminal 71c in switch 71. In this state, RFIC 3 receives, through LTE terminal 31c, input of reception signals of Band 2 of 4G-LTE that have sequentially passed through antenna 51, switch 71, reception filter 13R, switch 74, low-noise amplifier 43R, and switch 77.

Furthermore, the controller of RFIC 3 connects common terminal 85a and selection terminal 85c in switch 85, and connects common terminal 81a and selection terminal 81c in switch 81. In this state, RFIC 3 outputs the transmission signals of n66 of 5G-NR, from NR terminal 32b to transfer circuit 20. At this time, the transmission signals of n66 of 5G-NR that are output from NR terminal 32b sequentially pass through switch 85, power amplifier 61T, transmission filter 22T, and switch 81, and are then transmitted from antenna 52.

Furthermore, the controller of RFIC 3 connects terminal 86b and terminal 86d in switch 86, and connects common terminal 84a and selection terminal 84b in switch 84. In this state, RFIC 3 receives, through NR terminal 32d, input of reception signals of n66 of 5G-NR that have sequentially passed through antenna 52, switch 81, reception filter 21R, switch 84, low-noise amplifier 63R, and switch 86.

It should be noted that radio-frequency circuit 1 according to this embodiment can execute the transfer of reception signals of Band 2 of 4G-LTE by transfer circuit 20, in addition to the simultaneous transmission and reception of the radio-frequency signals of Band 2 of 4G-LTE by transfer circuit 10 and the radio-frequency signals of n66 of 5G-NR by transfer circuit 20. With regard to this, the controller of RFIC 3 connects terminal 86a and terminal 86c in switch 86, and connects common terminal 83a and selection terminal 83c in switch 83. In this state, RFIC 3 receives, through LTE terminal 31d, input of reception signals of Band 2 of 4G-LTE that have sequentially passed through antenna 53, switch 81, reception filter 23R, switch 83, low-noise amplifier 62R, and switch 86.

According to this configuration, together with the simultaneous transmission and reception of the radio-frequency signals of Band 2 of 4G-LTE by transfer circuit 10 and the radio-frequency signals of n66 of 5G-NR by transfer circuit 20, radio-frequency circuit 1 can use transfer circuit 20 as a diversity circuit that transfers the reception signals of Band 2 of 4G-LTE. Stated differently, radio-frequency circuit 1 can use transfer circuit 20 which is a diversity circuit, as a circuit that executes EN-DC.

It should be noted that, at this time, antenna 52 is an antenna for transmitting and receiving radio-frequency signals in the EN-DC by transfer circuit 20, and antenna 53 is an antenna for transmitting and receiving the radio-frequency signals of transfer circuit 20 as a diversity circuit.

Figure 5:
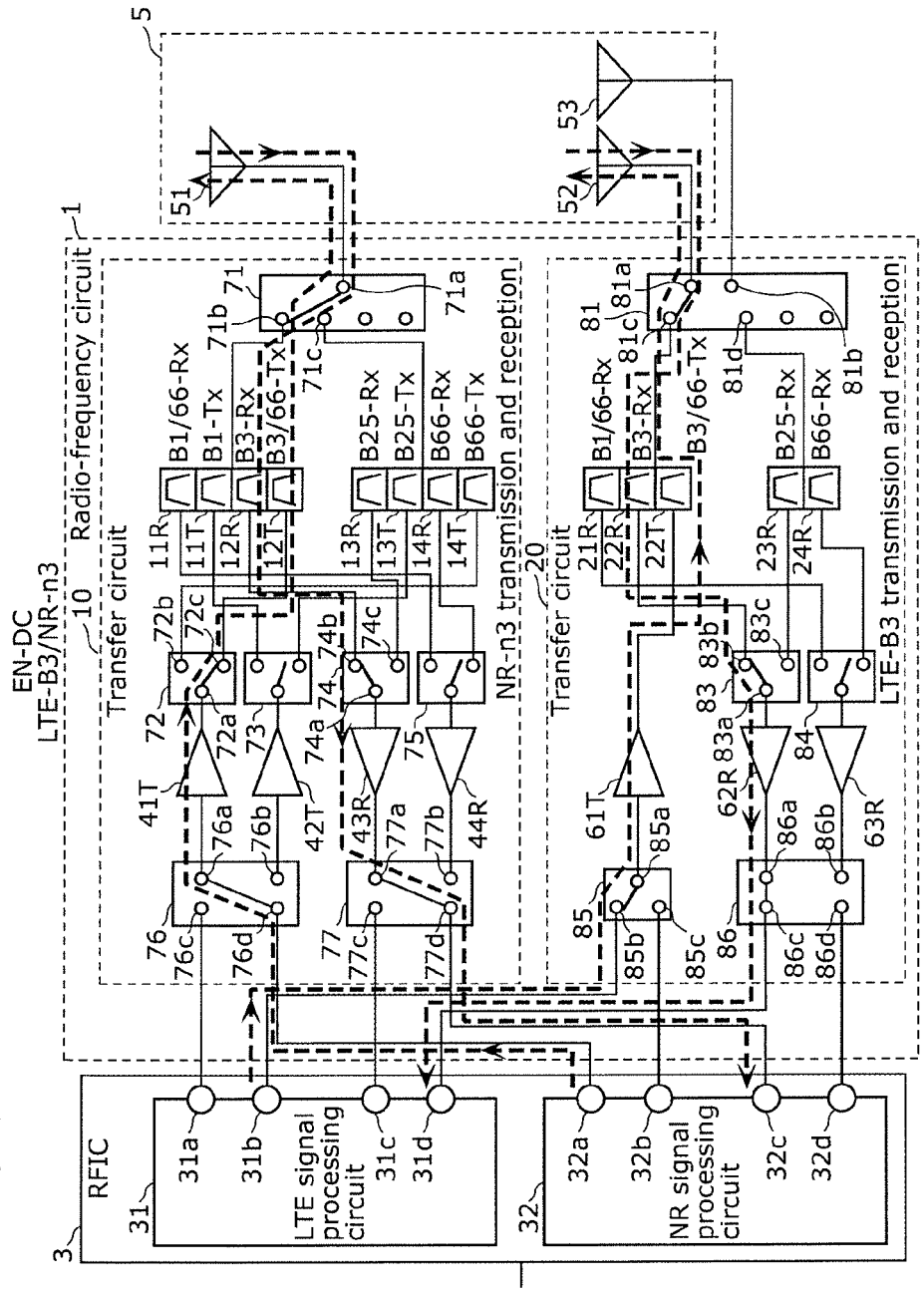
FIG. 5 is a circuit diagram illustrating the signal flow in a second EN-DC of the radio-frequency circuit according to the embodiment.

FIG. 5 is a circuit diagram illustrating the signal flow in the second EN-DC of radio-frequency circuit 1 according to the embodiment. The figure illustrates the circuit state and flow of signals in the second EN-DC of (2) the transmission and reception of radio-frequency signals of Band 3 of 4G-LTE by transfer circuit 20 and the transmission and reception of radio-frequency signals of n3 of 5G-NR by transfer circuit 10.

In executing the second EN-DC, RFIC 3 controls the connection state of the respective switches of radio-frequency circuit 1 to cause transfer circuit 20 to transfer radio-frequency signals of Band 3 of 4G-LTE and cause transfer circuit 10 to transfer radio-frequency signals of n3 of 5G-NR.

Specifically, the controller of RFIC 3 connects terminal 76a and terminal 76d in switch 76, connects common terminal 72a and selection terminal 72c in switch 72, and connects common terminal 71a and selection terminal 71b in switch 71. In this state, RFIC 3 outputs the transmission signals of n3 of 5G-NR, from NR terminal 32a to transfer circuit 10. At this time, the transmission signals of n3 of 5G-NR that are output from NR terminal 32a sequentially pass through switch 76, power amplifier 41T, switch 72, transmission filter 12T, and switch 71, and are then transmitted from antenna 51.

Furthermore, the controller of RFIC 3 connects terminal 77a and terminal 77d in switch 77, connects common terminal 74a and selection terminal 74b in switch 74, and connects common terminal 71a and selection terminal 71b in switch 71. In this state, RFIC 3 receives, through NR terminal 32c, input of reception signals of n3 of 5G-NR that have sequentially passed through antenna 51, switch 71, reception filter 12R, switch 74, low-noise amplifier 43R, and switch 77.

Furthermore, the controller of RFIC 3 connects common terminal 85a and selection terminal 85b in switch 85, and connects common terminal 81a and selection terminal 81c in switch 81. In this state, RFIC 3 outputs the transmission signals of Band 3 of 4G-LTE, from LTE terminal 31b to transfer circuit 20. At this time, the transmission signals of Band 3 of 4G-LTE that are output from LTE terminal 31b sequentially pass through switch 85, power amplifier 61T, transmission filter 22T, and switch 81, and are then transmitted from antenna 52.

Furthermore, the controller of RFIC 3 connects terminal 86a and terminal 86c in switch 86, connects common terminal 83a and selection terminal 83b in switch 83, and connects common terminal 81a and selection terminal 81c in switch 81. In this state, RFIC 3 receives, through LTE terminal 31d, input of reception signals of Band 3 of 4G-LTE that have sequentially passed through antenna 52, switch 81, reception filter 22R, switch 83, low-noise amplifier 62R, and switch 86.

3. CONFIGURATION OF RADIO-FREQUENCY CIRCUIT 1A AND COMMUNICATION DEVICE 6A ACCORDING TO VARIATION 1

Figure 6:
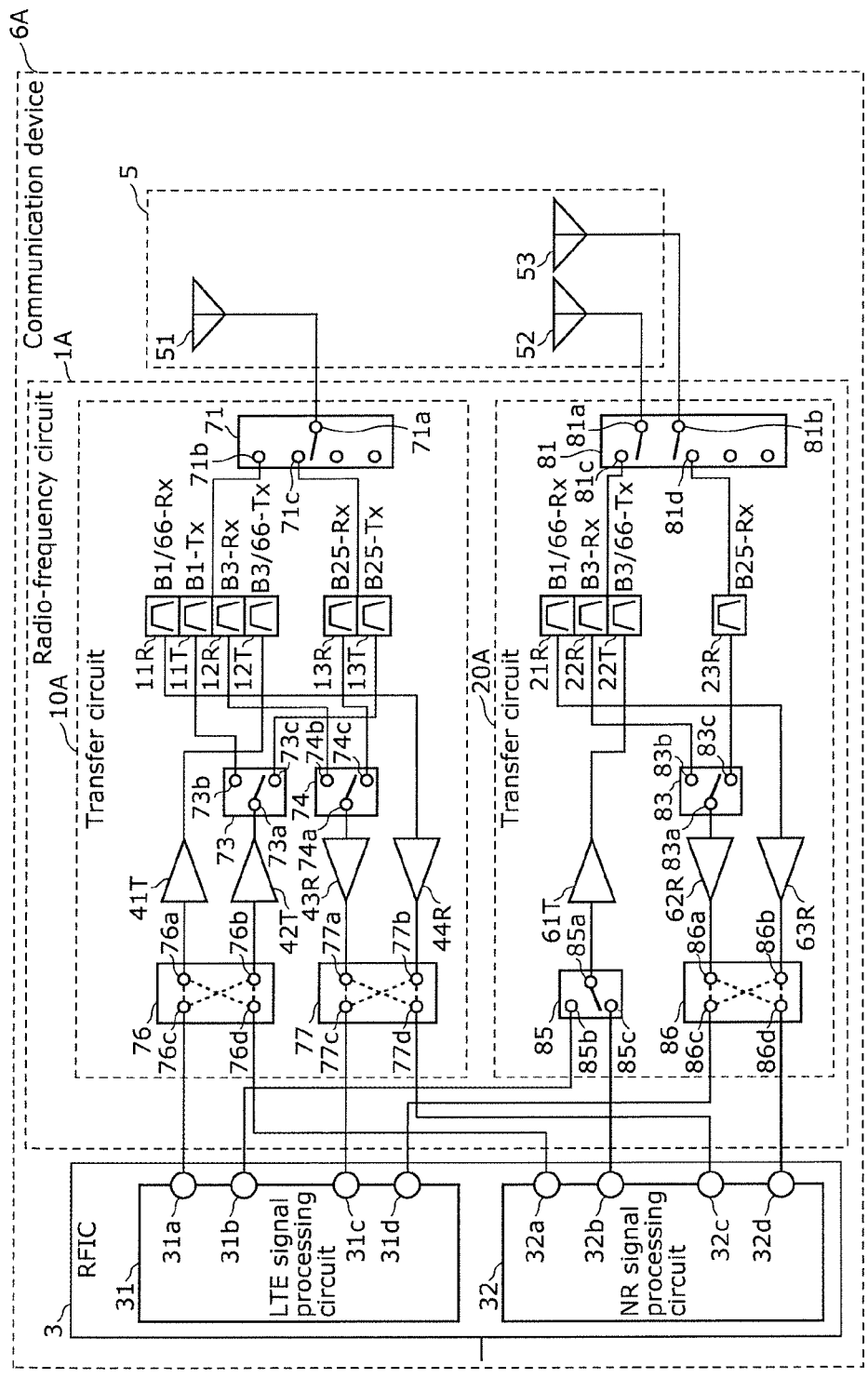
FIG. 6 is an example of a circuit configuration diagram of a radio-frequency circuit and a communication device according to Variation 1 of the embodiment.

FIG. 6 is an example of a circuit configuration diagram of radio-frequency circuit 1A and communication device 6A according to Variation 1 of the embodiment. As illustrated in the figure, communication device 6A includes radio-frequency circuit 1A, antenna circuit 5, and RF signal processing circuit (RFIC) 3. Compared to communication device 6 according to the embodiment, communication device 6A according to this variation is different in the configuration of radio-frequency circuit 1A.

Radio-frequency circuit 1A includes transfer circuits 10A and 20A. Compared to radio-frequency circuit 1 according to the embodiment, radio-frequency circuit 1A according to this variation is different in the configuration of transfer circuits 10A and 20A. Hereinafter, description of radio-frequency circuit 1A according to this variation will omit the elements that are the same as in radio-frequency circuit 1 according to the embodiment and will focus on those elements that are different.

Transfer circuit 10A is an example of a second transfer circuit, and transfers, for example, radio-frequency signals of communication bands 1, 3, 25, and 66. Communication bands 1, 3, 25, and 66 are used in both 4G-LTE and 5G-NR. 4G is an example of a first communication system and 5G is an example of a second communication system.

Transfer circuit 10A includes, transmission filters 11T, 12T, and 13T, reception filters 11R, 12R, and 13R, power amplifiers 41T and 42T, low-noise amplifiers 43R and 44R, and switches 71, 73, 74, 76, and 77. Compared to transfer circuit 10 according to the embodiment, transfer circuit 10A according to this variation is different in that transmission filter 14T, reception filter 14R, and switches 72 and 75 are not provided. Hereinafter, description of transfer circuit 10A according to this variation will omit the elements that are the same as in transfer circuit 10 according to the embodiment and will focus on those elements that are different.

The output terminal of reception filter 11R is connected to the input terminal of low-noise amplifier 44R.

The output terminal of transmission filter 12T is connected to the output terminal of power amplifier 41T.

Transmission filters 11T and 12T and reception filters 11R and 12R are included in a first multiplexer that demultiplexes and multiplexes radio-frequency signals of communication bands 1, 3, and 66.

Transmission filter 13T and reception filter 13R are included in a duplexer that demultiplexes and multiplexes radio-frequency signals of communication band 25.

Power amplifier 41T is connected between switch 76 and transmission filter 12T.

Low-noise amplifier 44R is connected between reception filter 11R and switch 77.

According to the above-described configuration of transfer circuit 10A, transfer circuit 10A can execute the transmission and reception of the radio-frequency signals of Band 1, Band 3, Band 25, and Band 66 of 4G-LTE, and the transmission and reception of the radio-frequency signals of n1, n3, n25, and n66 of 5G-NR.

According to the above-described configuration of transfer circuit 10A, the transfer of transmission signals of two bands, communication band 3 and communication band 66, that have at least partially overlapping frequencies can be realized by sharing the single power amplifier 41T and the single transmission filter 12T. Furthermore, the transfer of reception signals of the two communication bands, communication band 1 and communication band 66, that have at least partially overlapping frequencies can be realized by sharing the single low-noise amplifier 44R and the single reception filter 11R. Compared to transfer circuit 10 according to the embodiment, transfer circuit 10A according to this variation is different in that transmission filter 14T, reception filter 14R, and switches 72 and 75 are not provided. Accordingly, since circuit elements included in transfer circuit 10A can be reduced, radio-frequency circuit 1A can be miniaturized.

Transfer circuit 20A is an example of a first transfer circuit, and transfers, for example, radio-frequency signals of communication bands 1, 3, 25, and 66. Communication bands 1, 3, 25, and 66 are used in both 4G-LTE and 5G-NR.

Transfer circuit 20A includes transmission filter 22T, reception filters 21R, 22R, and 23R, power amplifier 61T, low-noise amplifiers 62R and 63R, and switches 81, 83, 85, and 86. Compared to transfer circuit 20 according to the embodiment, transfer circuit 20A according to this variation is different in that reception filter 24R and switch 84 are not provided. Hereinafter, description of transfer circuit 20A according to this variation will omit the elements that are the same as in transfer circuit 20 according to the embodiment and will focus on those elements that are different.

The output terminal of reception filter 21R is connected to the input terminal of low-noise amplifier 63R.

Transmission filter 22T and reception filters 21R and 22R are included in a third multiplexer that demultiplexes and multiplexes radio-frequency signals of communication bands 1, 3, and 66.

Low-noise amplifier 63R is connected between reception filter 21R and switch 86.

According to the above-described configuration of transfer circuit 20A, transfer circuit 20A can execute the transmission of the radio-frequency signals of Band 3 and Band 66 of 4G-LTE, the reception of the radio-frequency signals of Band 1, Band 3, Band 25, and Band 66 of 4G-LTE, the transmission of the radio-frequency signals of n3 and n66 of 5G-NR, and the reception of the radio-frequency signals of n1, n3, n25, and n66 of 5G-NR.

According to the above-described configuration of transfer circuit 20A, the transfer of transmission signals of two bands, communication band 3 and communication band 66, that have at least partially overlapping frequencies can be realized by sharing the single power amplifier 61T and the single transmission filter 22T. Furthermore, the transfer of reception signals of two communication bands, communication band 1 and communication band 66, that have at least partially overlapping frequencies can be realized by sharing the single low-noise amplifier 63R and the single reception filter 21R. Specifically, compared to transfer circuit 20 according to the embodiment, transfer circuit 20A according to this variation is different in that reception filter 24R and switch 84 are not provided. Accordingly, since circuit elements included in transfer circuit 20A can be reduced, radio-frequency circuit 1A can be miniaturized.

4. CONFIGURATION OF RADIO-FREQUENCY CIRCUIT 1B AND COMMUNICATION DEVICE 6B ACCORDING TO VARIATION 2

Figure 7:
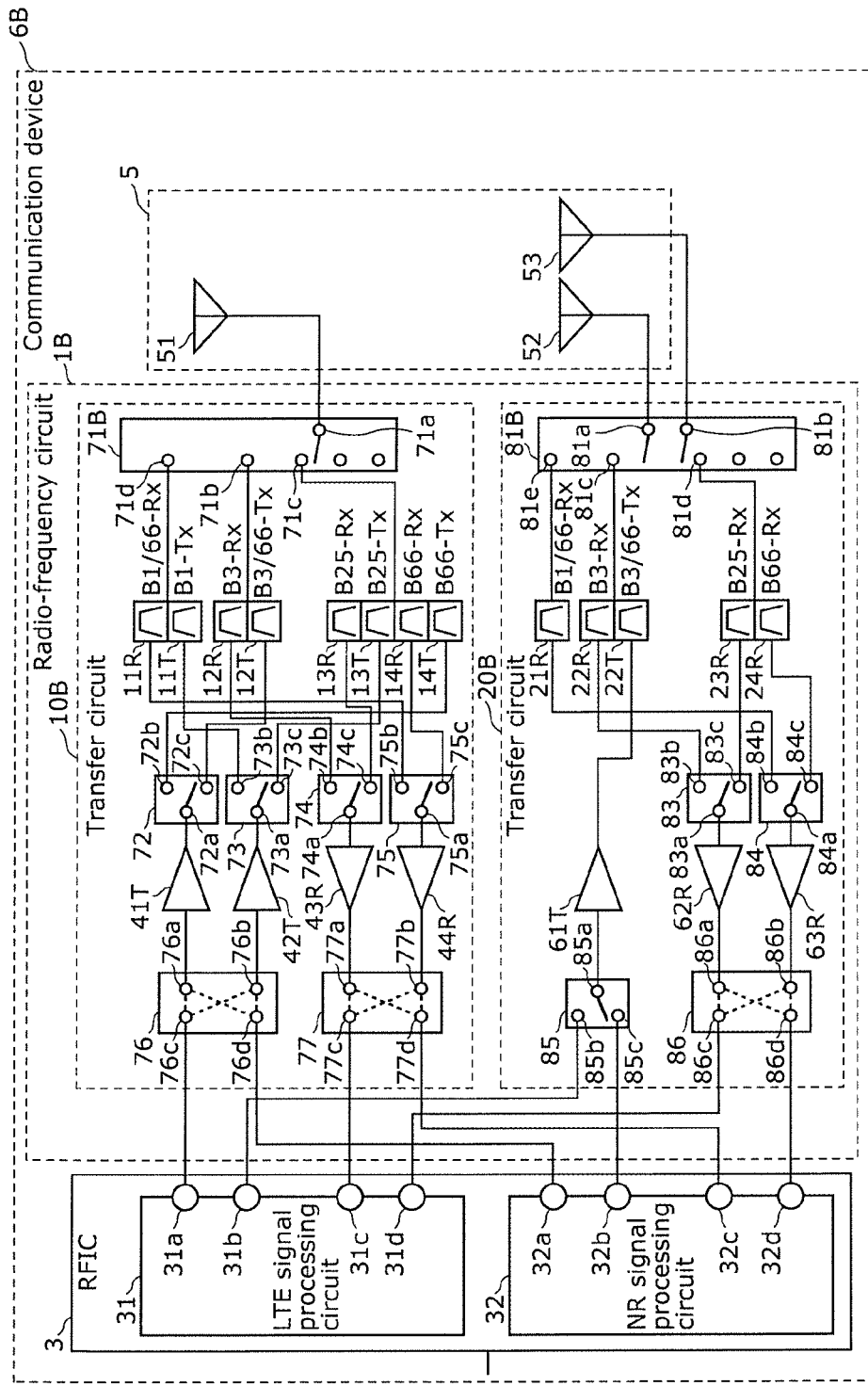
FIG. 7 is an example of a circuit configuration diagram of a radio-frequency circuit and a communication device according to Variation 2 of the embodiment.

FIG. 7 is an example of a circuit configuration diagram of radio-frequency circuit 1B and communication device 6B according to Variation 2 of the embodiment. As illustrated in the figure, communication device 6B includes radio-frequency circuit 1B, antenna circuit 5, and RF signal processing circuit (RFIC) 3. Compared to communication device 6 according to the embodiment, communication device 6B according to this variation is different in the configuration of radio-frequency circuit 1B.

Radio-frequency circuit 1B includes transfer circuits 10B and 20B. Compared to radio-frequency circuit 1 according to the embodiment, radio-frequency circuit 1B according to this variation is different in the configuration of transfer circuits 10B and 20B. Hereinafter, description of radio-frequency circuit 1B according to this variation will omit the elements that are the same as in radio-frequency circuit 1 according to the embodiment and will focus on those elements that are different.

Transfer circuit 10B is an example of a second transfer circuit. Transfer circuit 10B includes transmission filters 11T, 12T, 13T, and 14T, reception filters 11R, 12R, 13R, and 14R, power amplifiers 41T and 42T, low-noise amplifiers 43R and 44R, and switches 71B, 72, 73, 74, 75, 76, and 77.

Transmission filter 11T is an example of a third transmission filter, and has, as a passband, a transmission band (from 1920 MHz to 1980 MHz) of communication band 1. Transmission filter 11T is connected between selection terminal 71d of switch 71 and selection terminal 73b of switch 73.

Reception filter 11R has, as a passband, a band that includes a reception band (from 2110 MHz to 2170 MHz) of communication band and a reception band (from 2110 MHz to 2200 MHz) of communication band 66. It should be noted that the reception band of communication band 1 and the reception band of communication band 66 overlap at least partially. Transmission filter 11R is connected between selection terminal 71d of switch 71 and selection terminal 75b of switch 75. It should be noted that, depending on the region of use, communication band 66 becomes communication band 4 (a reception band from 2110 MHz to 2155 MHz).

Transmission filter 12T is an example of a second transmission filter and has, as a passband, a transmission band (from 1710 MHz to 1785 MHz) of communication band 3. It should be noted that the passband of transmission filter 12T includes the transmission band (from 1710 MHz to 1780 MHz) of communication band 66. Transmission filter 12T is connected between selection terminal 71b of switch 71 and selection terminal 72c of switch 72. It should be noted that, depending on the region of use, communication band 66 becomes communication band 4 (a transmission band from 1710 MHz to 1755 MHz).

Reception filter 12R has, as a passband, a reception band (from 1805 MHz to 1880 MHz) of communication band 3. Reception filter 12R is connected between selection terminal 71b of switch 71 and selection terminal 74b of switch 74.

Transmission filter 11T and reception filter 11R are included in a multiplexer that demultiplexes and multiplexes radio-frequency signals of communication bands 1 and 66. According to this configuration, the radio-frequency signals of communication bands 1 and 66 can be demultiplexed and multiplexed using the FDD method.

Transmission filter 12T and reception filter 12R are included in a multiplexer that demultiplexes and multiplexes radio-frequency signals of communication bands 3 and 66. According to this configuration, the radio-frequency signals of communication bands 3 and 66 can be demultiplexed and multiplexed using the FDD method.

Switch 71B includes common terminal 71a and selection terminals 71b (a first selection terminal), 71c, and 71d (a second selection terminal), and switches between connecting common terminal 71a and selection terminal 71b, connecting between common terminal 71a and selection terminal 71c, and connecting common terminal 71a and selection terminal 71d. Common terminal 71a is connected to antenna 51, selection terminal 71b is connected to a common terminal of a multiplexer that includes transmission filter 12T and reception filter 12R, selection terminal 71c is connected to a common terminal of a second multiplexer, selection terminal 71d is connected to a common terminal of a multiplexer that includes transmission filter 11T and reception filter 11R. According to the above-described configuration, switch 71B switches between connecting antenna 51 and the multiplexer that includes transmission filter 11T and reception filter 11R, connecting antenna 51 and the multiplexer that includes transmission filter 12T and reception filter 12R, and connecting antenna 51 and the second multiplexer.

According to the above-described configuration of transfer circuit 10B, transfer circuit 10B can execute the transmission and reception of the radio-frequency signals of Band 1, Band 3, Band 25, and Band 66 of 4G-LTE, and the transmission and reception of the radio-frequency signals of n1, n3, n25, and n66 of 5G-NR. In addition, the second multiplexer enables transmission and reception carrier aggregation (CA) of Band 25 and Band 66 of 4G-LTE and transmission and reception CA of n25 and n66 of 5G-NR.

Transfer circuit 20B is an example of a first transfer circuit, and transfers, for example, radio-frequency signals of communication bands 1, 3, 25, and 66. Communication bands 1, 3, 25, and 66 are used in both 4G-LTE and 5G-NR.

Transfer circuit 20B includes transmission filter 22T, reception filters 21R, 22R, 23R, and 24R, power amplifier 61T, low-noise amplifiers 62R and 63R, and switches 81B, 83, 84, 85, and 86.

Transmission filter 22T is an example of a first transmission filter. Transmission filter 22T is connected between selection terminal 81c of switch 81 and the output terminal of power amplifier 61T.

Reception filter 21R is an example of a second reception filter. Reception filter 21R is connected between selection terminal 81e of switch 81 and selection terminal 84b of switch 84.

Reception filter 22R is an example of a first reception filter. Transmission filter 22R is connected between selection terminal 81c of switch 81 and selection terminal 83b of switch 83.

Transmission filter 22T and reception filter 22R are included in a multiplexer that demultiplexes and multiplexes radio-frequency signals of communication bands 1, 3, and 66. According to this configuration, the radio-frequency signals of communication bands 1, 3 and 66 can be demultiplexed and multiplexed using the FDD method.

Switch 81B includes common terminals 81a and 81b and selection terminals 81c (a first selection terminal), 81d, and 81e (a second selection terminal). Switch 81B switches between connecting common terminal 81a and selection terminal 81c, connecting common terminal 81a and selection terminal 81d, and connecting common terminal 81a and selection terminal 81e, and switches between connecting common terminal 81b and selection terminal 81c, connecting common terminal 81b and selection terminal 81d, and connecting common terminal 81b and selection terminal 81e. Common terminal 81a is connected to antenna 52, common terminal 81b is connected to antenna 53, selection terminal 81c is connected to a common terminal of a multiplexer that includes transmission filter 22T and reception filter 22R, selection terminal 81d is connected to a common terminal of a fourth multiplexer, and selection terminal 81e is connected to reception filter 21R. According to the above-described configuration, switch 81B switches between connecting antenna 52 and the multiplexer that includes transmission filter 22T and reception filter 22R, connecting antenna 52 and the fourth multiplexer, and connecting antenna 52 and reception filter 21R, and switches between connecting antenna 53 and the multiplexer that includes transmission filter 22T and reception filter 22R, connecting antenna 53 and the fourth multiplexer, and connecting antenna 53 and reception filter 21R.

According to the above-described configuration of transfer circuit 20B, transfer circuit 20B can execute the transmission of the radio-frequency signals of Band 3 and Band 66 of 4G-LTE, the reception of the radio-frequency signals of Band 1, Band 3, Band 25, and Band 66 of 4G-LTE, the transmission of the radio-frequency signals of n3 and n66 of 5G-NR, and the reception of the radio-frequency signals of n1, n3, n25, and n66 of 5G-NR. In addition, the fourth multiplexer enables reception CA of Band 25 and Band 66 of 4G-LTE and reception CA of n25 and n66 of 5G-NR.

According to the above-described configuration of transfer circuits 10B and 20B, radio-frequency circuit 1B can simultaneously transfer radio-frequency signals of a first communication system and radio-frequency signals of a second communication system different from the first communication system. It should be noted that the first communication system and the second communication are systems of different communication standards, and the first communication system is, for example, 4G and the second communication system is, for example, 5G.

5. ADVANTAGEOUS EFFECTS, ETC

As described above, according to the foregoing embodiment, radio-frequency circuit 1 is used in simultaneous transfer of a radio-frequency signal of a first communication system (4G) and a radio-frequency signal of a second communication system (5G), and includes: transfer circuit 20 that receives one of the radio-frequency signal of the first communication system and the radio-frequency signal of the second communication system which are input in a switching manner, and transfers a radio-frequency signal of communication band 3 (a first communication band) including a first transmission band and a first reception band, and a radio-frequency signal of communication band 66 (a second communication band) including a second transmission band and a second reception band. The first transmission band and the second transmission band at least partially overlap. Transfer circuit 20 includes: power amplifier 61T that amplifies a transmission signal of communication band 3 and a transmission signal of communication band 66; and transmission filter 22T that has a first passband including the first transmission band and the second transmission band, and passes the transmission signal of communication band 3 and the transmission signal of communication band 66 which are output from power amplifier 61T.

A radio-frequency circuit that supports simultaneous transfer of radio-frequency signals of different communication systems requires circuit elements, such as amplifiers and filters, which transfer radio-frequency signals of a plurality of communication bands used in two communication systems. In this case, when circuit elements for the respective bands are provided, the number of circuit elements increases correspondingly to an increase in the combinations of communication bands to be simultaneously transferred, and thus the radio-frequency circuit increases in size.

In response to this, according to the above-described configuration, the transfer of transmission signals of two bands, communication band 3 and communication band 66, that have at least partially overlapping frequencies can be realized by sharing the single power amplifier 61T and the single transmission filter 22T. Therefore, since circuit elements included in transfer circuit 20 can be reduced, radio-frequency circuit 1 can be miniaturized.

Furthermore, transfer circuit 20 may include: one or more reception paths each for transferring a reception signal input via an antenna; and one or more transmission paths each for transferring a transmission signal to be output to an antenna. Each of the one or more reception paths may include a reception filter having a passband corresponding to a communication band. Each of the one or more transmission paths may include a transmission filter having a passband corresponding to a communication band. The number of the one or more reception paths may be greater than the number of the one or more transmission paths.

According to this configuration, transfer circuit 20 that supports the simultaneous transfer of radio-frequency signals of different communication systems can also be used as a diversity circuit.

Furthermore, in radio-frequency circuit 1, transfer circuit 20A transfers a radio-frequency signal of communication band 1 (a third communication band) including a third transmission band and a third reception band and a radio-frequency signal of communication band 66 (a fourth communication band) including a fourth transmission band and a fourth reception band. The third reception band and the fourth reception band at least partially overlap. Transfer circuit 20A further includes: reception filter 21R that has a second passband including the third reception band and the fourth reception band, and passes a reception signal of communication band 1 and a reception signal of communication band 66; and low-noise amplifier 63R that amplifies the reception signal of communication band 1 and the reception signal of communication band 66 passed by the second reception filter.

According to this configuration, the transfer of reception signals of two communication bands, communication band 1 and communication band 66, that have at least partially overlapping frequencies can be realized by sharing the single low-noise amplifier 63R and the single reception filter 21R. Accordingly, since circuit elements included in transfer circuit 20A can be reduced, radio-frequency circuit 1A can be miniaturized.

It should be noted that the fourth communication band and the second communication band need not necessarily be the same communication band.

Furthermore, transmission filter 22T and reception filter 21R may be included in a multiplexer.

According to this configuration, the radio-frequency signals of communication bands 1, 3 and 66 can be demultiplexed and multiplexed using the FDD method.

Furthermore, transfer circuit 20 may further include: reception filter 22R that passes a reception signal of the first communication band; and switch 81B that includes common terminal 81a, selection terminal 81c connected to reception filter 22R, and selection terminal 81e connected to reception filter 21R, and switches between connecting and disconnecting common terminal 81a and selection terminal 81c, and switches between connecting and disconnecting common terminal 81a and 81e selection terminal.

Furthermore, transfer circuit 20 may include switches 85 and 86 that switch between transferring of the radio-frequency signal of the first communication system (4G) and transferring of the radio-frequency signal of the second communication system (5G).

According to this configuration, in the simultaneous transfer of radio-frequency signals of different communication systems, transfer circuit 20 can transfer both the radio-frequency signals of the first communication system and the radio-frequency signals of the second communication system by switching between the respective radio-frequency signals.

Furthermore, radio-frequency circuit 1 may further include transfer circuit 10 that receives one of the radio-frequency signal of the first communication system (4G) and the radio-frequency signal of the second communication system (5G) which are input in a switching manner. Transferring of the radio-frequency signal of one of the first communication system and the second communication system by transfer circuit 20 and transferring of the radio-frequency signal of the other of the first communication system and the second communication system by transfer circuit 10 may be simultaneously executed.

According to this, the simultaneous transfer of the radio-frequency signals of the first communication system and the radio-frequency signals of the second communication system can be realized in radio-frequency circuit 1 from which circuit elements have been emitted.

Furthermore, transfer circuit 10 may include: transmission filter 12T that pass a transmission signal of the first communication band and the transmission signal of the second communication band; transmission filter 11T that passes a transmission signal of the third communication band; and switch 71B that includes common terminal 71a, selection terminal 71b connected to transmission filter 12T, and selection terminal 71d connected to transmission filter 11T, and switches between connecting and disconnecting common terminal 71a and selection terminal 71b, and switches between connecting and disconnecting common terminal 71a and selection terminal 71d.

Furthermore, radio-frequency circuit 1 may further include switches 76, 77, 85, and 86 that switch exclusively between the transferring of the radio-frequency signal of one of the first communication system and the second communication system by transfer circuit 20 and the transferring of the radio-frequency signal of the other of the first communication system and the second communication system by transfer circuit 10.

According to this configuration, transfer circuits 10 and 20 can efficiently execute the simultaneous transfer of radio-frequency signals of different communication systems.

Furthermore, each of transfer circuits 10 and 20 may include: one or more reception paths each for transferring a reception signal input via an antenna; and one or more transmission paths each for transferring a transmission signal to be output to an antenna. Each of the one or more reception paths may include a reception filter having a passband that corresponds to a communication band, and each of the one or more transmission paths may include a transmission filter having a passband that corresponds to a communication band. The total number of the one or more reception paths and the one or more transmission paths included in transfer circuit 20 may be less than the total number of the one or more reception paths and the one or more transmission paths included in transfer circuit 10.

Transfer circuit 20 includes reception paths for the communication bands of the transmission paths included in transfer circuit 10 but does not include all of the transmission paths for the communication bands of the transmission paths included in transfer circuit 10. Specifically, transfer circuit 20 can function as a circuit that supports ED-DC while functioning as a diversity circuit of transfer circuit 10.

Furthermore, communication device 6 includes: RFIC 3 that processes a radio-frequency signal transmitted and/or received by an antenna; and radio-frequency circuit 1 that transfers the radio-frequency signal between the antenna and RFIC 3.

According to this configuration, a miniaturized communication device 6 capable of simultaneously transferring radio-frequency signals of different communication bands can be provided.

Although the radio-frequency circuit and communication device according to the present disclosure have been described above based on an exemplary embodiment and variations thereof, the radio-frequency circuit and communication device according to the present disclosure are not limited to the exemplary embodiment and the variations thereof. The present disclosure also encompasses other embodiments achieved by combining arbitrary elements in the foregoing embodiment and variations thereof, variations resulting from various modifications to the foregoing embodiment and variations thereof that may be conceived by those skilled in the art without departing from the essence of the present disclosure, and various devices that include the radio-frequency circuit and the communication device according to the foregoing embodiment and variations thereof.

For example, in the radio-frequency circuit and communication device according to the foregoing embodiment and variations thereof, another radio-frequency circuit element and wiring may be inserted in a path connecting respective circuit elements and signal paths which are disclosed in the drawings.

Furthermore, the controller according to the present disclosure may be realized as an integrated circuit (IC) or large scale integration (LSI). Furthermore, the method of implementation of structural elements using an integrated circuit may be realized using a dedicated circuit or a general-purpose processor. A field programmable gate array (FPGA) that allows for programming after the manufacture of an LSI, or a reconfigurable processor that allows for reconfiguration of the connection and the setting of circuit cells inside an LSI may be employed. When circuit integration technology that replaces LSIs comes along owing to advances of the semiconductor technology or to a separate derivative technology, the function blocks may understandably be integrated using that technology.

The present disclosure can be widely used in communication apparatuses such as a mobile phone, as a radio-frequency circuit and a communication device that simultaneously transfer radio-frequency signals of two or more different communication systems.

The invention claimed is:

1. A radio-frequency circuit configured to simultaneously transfer a radio-frequency signal of a fourth generation communication system (4G) and a radio-frequency signal of a fifth generation communication system (5G), the radio-frequency circuit comprising:
   a first transfer circuit configured to selectively receive the 4G radio-frequency signal or the 5G radio-frequency signal, and to transfer a radio-frequency signal of a first communication band of the 4G or 5G communication system, and a radio-frequency signal of a second communication band of the 4G or 5G communication system,
   wherein the first communication band includes a first transmission band and a first reception band, and the second communication band includes a second transmission band and a second reception band, wherein the first communication band and the second communication band are of the same communication system, wherein the first transmission band and the second transmission band at least partially overlap, wherein the first transfer circuit comprises:
- a first power amplifier configured to amplify a transmission signal of the first transmission band and a transmission signal of the second transmission band; and
- a first transmission filter having a passband that includes the first transmission band and the second transmission band, the first transmission filter being configured to pass the transmission signal of the first transmission band and the transmission signal of the second transmission band, the transmission signals of the first and second transmission bands being output from the first power amplifier, and wherein the first transfer circuit comprises a greater number of reception paths than transmission paths.

2. A radio-frequency circuit configured to simultaneously transfer a radio-frequency signal of a fourth generation communication system (4G) and a radio-frequency signal of a fifth generation communication system (5G), the radio-frequency circuit comprising:

a first transfer circuit configured to selectively receive the 4G radio-frequency signal or the 5G radio-frequency signal, and to transfer a radio-frequency signal of a first communication band of the 4G or 5G communication system, and a radio-frequency signal of a second communication band of the 4G or 5G communication system, wherein the first communication band includes a first transmission band and a first reception band, and the second communication band includes a second transmission band and a second reception band, wherein the first communication band and the second communication band are of the same communication system, wherein the first transmission band and the second transmission band at least partially overlap, wherein the first transfer circuit comprises:
- a first power amplifier configured to amplify a transmission signal of the first transmission band and a transmission signal of the second transmission band; and
- a first transmission filter having a passband that includes the first transmission band and the second transmission band, the first transmission filter being configured to pass the transmission signal of the first transmission band and the transmission signal of the second transmission band, the transmission signals of the first and second transmission bands being output from the first power amplifier, wherein the first transfer circuit further comprises:
- one or more reception paths, each configured to transfer a reception signal received from an antenna; and
- one or more transmission paths, each configured to transfer a transmission signal to be output to an antenna, wherein each of the reception paths comprises a reception filter having a passband corresponding to a communication band, wherein each of the transmission paths comprises a transmission filter having a passband corresponding to a communication band, and wherein a total number of the reception paths is greater than a total number of the transmission paths.

3. A radio-frequency circuit configured to simultaneously transfer a radio-frequency signal of a fourth generation communication system (4G) and a radio-frequency signal of a fifth generation communication system (5G), the radio-frequency circuit comprising:

a first transfer circuit configured to selectively receive the 4G radio-frequency signal or the 5G radio-frequency signal, and to transfer a radio-frequency signal of a first communication band of the 4G or 5G communication system, and a radio-frequency signal of a second communication band of the 4G or 5G communication system, wherein the first communication band includes a first transmission band and a first reception band, and the second communication band includes a second transmission band and a second reception band, wherein the first communication band and the second communication band are of the same communication system, wherein the first transmission band and the second transmission band at least partially overlap, wherein the first transfer circuit comprises:
- a first power amplifier configured to amplify a transmission signal of the first transmission band and a transmission signal of the second transmission band; and
- a first transmission filter having a passband that includes the first transmission band and the second transmission band, the first transmission filter being configured to pass the transmission signal of the first transmission band and the transmission signal of the second transmission band, the transmission signals of the first and second transmission bands being output from the first power amplifier, wherein the first transfer circuit is further configured to transfer a radio-frequency signal of a third communication band and a radio-frequency signal of a fourth communication band, wherein the third communication band includes a third transmission band and a third reception band, and the fourth communication band includes a fourth transmission band and a fourth reception band, wherein the third reception band and the fourth reception band at least partially overlap, and wherein the first transfer circuit further comprises:
- a second reception filter having a passband that includes the third reception band and the fourth reception band, the second transmission filter being further configured to pass a reception signal of the third communication band and a reception signal of the fourth communication band; and
- a second low-noise amplifier configured to amplify the reception signal of the third reception band and the reception signal of the fourth reception band, the reception signals of the third and fourth reception bands being passed by the second reception filter.

4. The radio-frequency circuit according to claim 3, wherein:

the fourth communication band is the second communication band, the third reception band and the second reception band at least partially overlap, the passband of the second reception filter further includes the second reception band, the second reception filter being further configured to pass a reception signal of the second communication band, and the second low-noise amplifier is configured to amplify the reception signal of the third communication band and the reception signal of the second communication band passed by the second reception filter.

5. The radio-frequency circuit according to claim 4, wherein:
the first communication band is Band 3 of 4G, the second communication band is Band 66 of 4G, and the third communication band is Band 1 of 4G, or
the first communication band is Band n3 of 5G, the second communication band is Band n66 of 5G, and the third communication band is Band n1 of 5G.

6. The radio-frequency circuit according to claim 3, wherein the first transmission filter and the second reception filter are in a multiplexer.

7. The radio-frequency circuit according to claim 3, wherein the first transfer circuit further comprises:
a first reception filter configured to pass a reception signal of the first communication band; and
a switch comprising a common terminal, a first selection terminal connected to the first reception filter, and a second selection terminal connected to the second reception filter, the switch being configured to selectively switch connection of the common terminal between the first selection terminal and the second selection terminal.

8. The radio-frequency circuit according to claim 7, wherein:
the first communication band is Band 3 of 4G, the second communication band is Band 66 of 4G, and the third communication band is Band 1 of 4G, or
the first communication band is Band n3 of 5G, the second communication band is Band n66 of 5G, and the third communication band is Band n1 of 5G.

9. A radio-frequency circuit configured to simultaneously transfer a radio-frequency signal of a fourth generation communication system (4G) and a radio-frequency signal of a fifth generation communication system (5G), the radio-frequency circuit comprising:
a first transfer circuit configured to selectively receive the 4G radio-frequency signal or the 5G radio-frequency signal, and to transfer a radio-frequency signal of a first communication band of the 4G or 5G communication system, and a radio-frequency signal of a second communication band of the 4G or 5G communication system; and
a second transfer circuit configured to selectively receive the 4G radio-frequency signal or the 5G radio-frequency signal,
wherein the first communication band includes a first transmission band and a first reception band, and the second communication band includes a second transmission band and a second reception band,
wherein the first communication band and the second communication band are of the same communication system,
wherein the first transmission band and the second transmission band at least partially overlap,
wherein the first transfer circuit comprises:
a first power amplifier configured to amplify a transmission signal of the first transmission band and a transmission signal of the second transmission band; and
a first transmission filter having a passband that includes the first transmission band and the second transmission band, the first transmission filter being configured to pass the transmission signal of the first transmission band and the transmission signal of the second transmission band, the transmission signals of the first and second transmission bands being output from the first power amplifier, and
wherein the first transfer circuit and the second transfer circuit are configured to simultaneously transfer a different one of the 4G radio-frequency signal and the 5G radio-frequency signal.

10. The radio-frequency circuit according to claim 9, wherein the second transfer circuit comprises:
a second transmission filter configured to pass the first transmission signal and the second transmission signal;
a third transmission filter configured to pass a third transmission signal of a third communication band; and
a switch comprising a common terminal, a first selection terminal connected to the second transmission filter, and a second selection terminal connected to the third transmission filter, the switch being configured to selectively switch connection of the common terminal between the first selection terminal and the second selection terminal.

11. The radio-frequency circuit according to claim 10, wherein:
the first communication band is Band 3 of 4G, the second communication band is Band 66 of 4G, and the third communication band is Band 1 of 4G, or
the first communication band is Band n3 of 5G, the second communication band is Band n66 of 5G, and the third communication band is band n1 of 5G.

12. The radio-frequency circuit according to claim 9, further comprising:
a second switch circuit configured to selectively switch between a first connection state and a second connection state, wherein:
in the first connection state, the first transfer circuit is configured to transfer the 4G radio-frequency signal and the second transfer circuit is configured to transfer the 5G radio-frequency signal, and
in the second connection state, the first transfer circuit is configured to transfer the 5G radio-frequency signal and the second transfer circuit is configured to transfer the 4G radio-frequency signal.

13. The radio-frequency circuit according to claim 9, wherein:
the first transfer circuit further comprises:
one or more reception paths, each configured to transfer a reception signal received from an antenna; and
one or more transmission paths, each configured to transfer a transmission signal to be output to an antenna,
the second transfer circuit comprises:
one or more reception paths, each configured to transfer a reception signal received from an antenna; and
one or more transmission paths, each configured to transfer a transmission signal to be output to an antenna,
each of the reception paths comprises a reception filter having a passband that corresponds to a communication band,
each of the transmission paths comprises a transmission filter having a passband that corresponds to a communication band, and
a total number of the reception paths and the transmission paths in the first transfer circuit is less than a total number of the reception paths and the transmission paths in the second transfer circuit.

\* \* \* \* \*

UNITED STATES PATENT AND TRADEMARK OFFICE
CERTIFICATE OF CORRECTION

PATENT NO. : 11,621,733 B2
APPLICATION NO. : 17/501550
DATED : April 4, 2023
INVENTOR(S) : Atsushi Ono et al.

It is certified that error appears in the above-identified patent and that said Letters Patent is hereby corrected as shown below:

In the Specification

Column 4, Line 6, "communication band and" should be -- communication band 1 and --.

Column 19, Line 19, "communication band and" should be -- communication band 1 and --.

Signed and Sealed this
Second Day of January, 2024

Katherine Kelly Vidal
Director of the United States Patent and Trademark Office